US012800905B2

(12) United States Patent
Lin et al.

(10) Patent No.: US 12,800,905 B2
(45) Date of Patent: Nov. 17, 2026

(54) PERISCOPE TYPE LENS DEVICE

(71) Applicants: Sintai Optical (Shenzhen) Co., Ltd., ShenZhen City (CN); Asia Optical Co., Inc., Taichung (TW)

(72) Inventors: Guo-Quan Lin, ShenZhen City (CN); Hsi-Ling Chang, Taichung (TW); Chien-Hung Chen, Taichung (TW); Bo-Yan Chen, Taichung (TW); Ming-Huang Tseng, Taichung (TW); Ming-Wei Shih, Taichung (TW)

(73) Assignees: SINTAI OPTICAL (SHENZHEN) CO., LTD., Shenzhen City (CN); ASIA OPTICAL CO., INC., Taichung (TW)

( * ) Notice: Subject to any disclaimer, the term of this patent is extended or adjusted under 35 U.S.C. 154(b) by 556 days.

(21) Appl. No.: 18/336,082

(22) Filed: Jun. 16, 2023

(65) Prior Publication Data

US 2024/0019681 A1 Jan. 18, 2024

(30) Foreign Application Priority Data

Jul. 1, 2022 (CN) ........................ 202210769951.X
Jul. 14, 2022 (CN) ........................ 202210831402.0

(51) Int. Cl.

*G02B 23/08* (2006.01)
*G02B 3/00* (2006.01)
*G02B 7/10* (2021.01)
*G02B 15/14* (2006.01)
*G02B 23/06* (2006.01)

(52) U.S. Cl.

CPC ........... *G02B 23/08* (2013.01); *G02B 3/0062* (2013.01); *G02B 7/10* (2013.01); *G02B 15/1431* (2019.08); *G02B 23/06* (2013.01)

(58) Field of Classification Search

CPC .. G02B 23/08; G02B 15/1431; G02B 3/0062; G02B 7/10; G02B 23/06
USPC .......................................................... 359/402
See application file for complete search history.

(56) References Cited

U.S. PATENT DOCUMENTS

2004/0090683 A1* 5/2004 Nagata ............... G02B 13/0065 359/736
2004/0109076 A1* 6/2004 Yokota ................... H04N 23/55 348/335
2019/0212632 A1* 7/2019 Miller ...................... G03B 3/10
2019/0331908 A1* 10/2019 Shih ....................... G02B 23/08
2020/0096745 A1* 3/2020 Chang ...................... G03B 5/04
2021/0044729 A1* 2/2021 Wang ....................... G02B 7/08
2022/0099950 A1* 3/2022 Shih ......................... G02B 5/04

FOREIGN PATENT DOCUMENTS

CN 110879454 A 3/2020
CN 111929859 A 11/2020
CN 112532816 A 3/2021
CN 113219628 A 8/2021
CN 214586220 U 11/2021

* cited by examiner

*Primary Examiner* — Sharrief I Broome
(74) *Attorney, Agent, or Firm* — McClure, Qualey & Rodack, LLP

(57) ABSTRACT

A lens device includes a lens module, a light path turning module, and an image forming unit. Light passing through the lens module is reflected at least twice by the light path turning module before reaching the image forming unit. This configuration provides a longer effective focal length and back focal length, facilitating installation within limited spaces.

19 Claims, 19 Drawing Sheets

PERISCOPE TYPE LENS DEVICE

BACKGROUND OF THE INVENTION

Field of the Invention

The invention relates to an optical field and in particular relates to a lens device.

Description of the Related Art

A periscope lens is a retractable lens that doesn't stick out of the body of a camera, a phone, or other camera devices. The principle of a periscope lens is very simple. The light path of the periscope lens is not straight. Instead, light is reflected into the body of the camera, mobile phone or other camera devices by a mirror or a prism. During the zooming and focusing operation, the lenses are moved in the device body without sticking out therefrom. Such arrangement is advantageous to miniaturization of the camera, mobile phone or other camera devices, reduction of the volume of the product, and protection of the periscope lens from damage.

FIG. 1 is a schematic diagram of a periscope lens device. As shown in FIG. 1, the periscope lens device 10 includes a lens module 11, prisms 12 and a photosensitive element 13. The lens module 11 includes a plurality of lenses arranged along the optical axis. The prisms 12 are disposed between the lens module 11 and the photosensitive element 13 for reflecting the light emitted from the lens module 11 and changing the traveling direction of the light.

For this type of periscope lens device, the photosensitive element 13 is not disposed on the optical axis. Therefore, the overall volume of the periscope lens device can effectively reduced, and the periscope lens device can be widely used in various electronic devices. Generally, one or two triangular prisms 12 are used in the periscope lens device to shorten the back focal length thereof.

A periscope lens is a preferred solution to resolve a conflict between the requirement of high zoom ratio and the requirement of miniaturization. Also, miniaturization is becoming a new trend of the development of lens devices. Accordingly, the invention provides a new type of lens device.

BRIEF SUMMARY OF THE INVENTION

The invention provides a lens device to address the described issues. The lens device of the invention is miniaturized and is capable of performing auto focus operation and good image forming performance. In other words, the lens device of the invention can meet the requirements of image forming of an optical lens device in a limited space.

The lens device in accordance with an exemplary embodiment of the invention includes a lens module, an image forming unit and a light path turning module. The lens module includes one or plural lenses. The light path turning module is disposed between the lens module and the image forming unit. The light exiting from the lens module is reflected at least twice by the light path turning module.

In another exemplary embodiment, the plural lenses include a first lens, a second lens and a third lens arranged in order along an optical axis from an object side to an image side; the lens device satisfies at least one following condition: $0.25 \leq Dm1/EFL \leq 0.65$, $0.2 \leq Dm2/EFL \leq 0.7$, $-10 < M1T-(L1Ø+L2Ø+L3Ø) < 10$, $1 < M1T/GP1T < 10$, $0 < (f1+f2+f3)/TTL < 28$, and $-1 < (R1+R2)/(R3+R4) < 3$, wherein Dm1 is a maximum diameter of the object side surface of the first lens for incidence of the light; Dm2 is a maximum diameter of an image side surface of the first lens for incidence of the light; L1Ø is an effective diameter of the object side surface of the first lens; L2Ø is an effective diameter of the object side surface of the second lens; L3Ø is an effective diameter of the object side of the third lens; M1T is a central thickness of the light path turning module, namely a total length of a path along which the light travels from a light incident surface of the light path turning module to a light emitting surface of the light path turning module; GP1T is a central distance from an intersection between the object side surface of the first lens and the optical axis to the light path turning module, namely a distance measured along the optical axis from the object side surface of the first lens to the light incident surface of the light path turning module; f1 is a focal length of the first lens; f2 is a focal length of the second lens; f3 is a focal length of the third lens; TTL is an optical total length along the optical axis from the object side surface of the first lens to an image forming plane; R1 is a radius of curvature of the object side surface of the first lens; R2 is a radius of curvature of the image side surface of the first lens; R3 is a radius of curvature of the object side surface of the second lens; and R4 is a radius of curvature of an image side surface of the second lens.

In yet another exemplary embodiment, the first lens is with positive refractive power and includes an object side surface that is a convex surface facing the object side.

In another exemplary embodiment, the second lens is with refractive power and includes an object side surface that is a convex surface facing the object side, and the third lens is with refractive power and includes an object side surface that is a convex surface facing the object side.

In yet another exemplary embodiment, the first lens further includes a convex surface facing the image side, the second lens is with positive refractive power and further includes a concave surface facing the image side, and the third lens is with positive refractive power and further includes a convex surface facing the image side.

In another exemplary embodiment, the first lens further includes a convex surface facing the image side, the second lens is with negative refractive power and further includes a concave surface facing the image side, and the third lens is with positive refractive power and further includes a convex surface facing the image side.

In yet another exemplary embodiment, the light path turning module includes a light incident surface, a first light reflective surface and a light emitting surface; the light emitted from the lens module enters the light path turning module through the light incident surface, is reflected on the first light reflective surface back to the light incident surface, is reflected on the light incident surface to the light emitting surface, passes through the light emitting surface, and reaches the image forming unit.

In another exemplary embodiment, the light path turning module includes a light incident surface, a first light reflective surface, a second light reflective surface and a light emitting surface; the light emitted from the lens module enters the light path turning module through the light incident surface, is reflected on the first light reflective surface back to the light incident surface, is reflected on the light incident surface to the second light reflective surface, is reflected on the second light reflective surface to the light emitting surface, passes through the light emitting surface, and reaches the image forming unit.

In yet another exemplary embodiment, the light path turning module includes a light incident surface, a first light reflective surface and a second light reflective surface; the light emitted from the lens module enters the light path turning module through the light incident surface, is reflected on the first light reflective surface back to the light incident surface, is reflected on the light incident surface to the second light reflective surface, is reflected on the second light reflective surface to the light incident surface, and exits from the light incident surface.

In another exemplary embodiment, the light path turning module includes a light incident surface, a first light reflective surface, a second light reflective surface, a third reflective surface and a light emitting surface; the light emitted from the lens module enters the light path turning module through the light incident surface, is reflected on the first light reflective surface back to the light incident surface, is reflected on the light incident surface to the second light reflective surface, is reflected on the second light reflective surface to the third reflective surface, is reflected on the third reflective surface to the light emitting surface, passes through the light emitting surface, and reaches the image forming unit.

In yet another exemplary embodiment, the light path turning module includes a light incident surface, a first light reflective surface, a second light reflective surface and a light emitting surface; the light emitted from the lens module enters the light path turning module through the light incident surface, is reflected on the first light reflective surface to the second light reflective surface, and is reflected on the second light reflective surface, passes through the light emitting surface, and reaches the image forming unit.

In another exemplary embodiment, the light path turning module includes connecting surfaces, the connecting surfaces are configured to form a concave structure on the light path turning module, wherein the concave structure has sufficient depth for blocking peripheral light reflected by the light reflective surfaces which are disposed adjacent to each other, a light absorbing film is formed on the connecting surfaces.

In yet another exemplary embodiment, the light path turning module includes a light incident surface and a light reflective surface, the lens module is disposed above the light incident surface, at a side of the light incident surface and aside from a center of the light incident surface.

In another exemplary embodiment, the light path turning module includes at least two light path turning elements, and the light path turning elements have an air gap therebetween and/or a light blocking stop therebetween.

In yet another exemplary embodiment, the lens module, the light path turning module and the image forming unit are arranged in order from an object side to an image side; a light incident surface of the light path turning module is perpendicular to an optical axis of the lens module for changing a light path from the lens module to the image forming unit by plural reflections; the lens module and the image forming unit are disposed at the same side of the light path turning module.

In another exemplary embodiment, the light path turning module includes a first light reflective surface, a second light reflective surface and a third reflective surface; the first light reflective surface meet the light incident surface; the second light reflective surface and the light incident surface lie on the same plane; the light coming from the lens module experiences three reflections in the light path turning module; the lens module is movable in a direction perpendicular to and/or parallel to the optical axis. Alternatively, the third reflective surface respectively intersects a plane on which the first light reflective surface lies and another plane on which the second light reflective surface lies; a light emitting surface of the light path turning module and the light incident surface lie on the same plane; a concave structure is formed between the first light reflective surface and the third reflective surface; the image forming unit is moved perpendicular to the light emitting surface.

In yet another exemplary embodiment, the lens device further includes a focusing unit configured to change an optical path length between the lens module and the image forming unit, wherein the focusing unit is disposed between the light path turning module and the image forming unit and includes a first focusing element and a second focusing element, the first focusing element and the second focusing element have a relative movement therebetween in same direction or in opposite directions.

In another exemplary embodiment, the first focusing element and the second focusing element are prisms and includes inclined surfaces; the inclined surfaces of the first focusing element and the second focusing element are disposed corresponding to each other; the first focusing element and the second focusing element have the relative movement therebetween in the opposite directions; the opposite directions and the light emitting surface have an included angle greater than 0° and less than 90°, or the first focusing element and the second focusing element are moved in parallel to the light emitting surface. Alternatively, the first focusing element and the second focusing element are lenses; the first focusing element and the second focusing element are moved perpendicular to the light emitting surface; the first focusing element and the second focusing element have the relative movement therebetween in the same direction which is parallel to the optical axis.

In yet another exemplary embodiment, the third reflective surface of the light path turning module respectively intersects a plane on which the first light reflective surface lies and another plane on which the light emitting surface lies, the third reflective surface of the light path turning module is disposed in parallel to a plane on which the second light reflective surface lies; the light path turning module includes a first prism and a second prism, the light incident surface, the first light reflective surface and the second light reflective surface are disposed on the first prism, the third reflective surface and the light emitting surface are disposed on the second prism, the first prism and the second prism have an air gap therebetween or are attached to each other; the first prism is substantially in shape of an isosceles triangle, and the second prism is substantially in shape of a right trapezoidal or trapezoid with right angles; the image forming unit is disposed corresponding to the light emitting surface, is disposed diagonally above the second prism, and is inclined with respect to the optical axis of the lens module.

Practice of the lens device of the invention has the following advantages: by means of plural reflections, the lens device not only has a high focal length but has the volume thereof reduced to the minimum. Also, the lens device is capable of auto focus operation and optical image stabilization. Specifically, a light path turning module is provided to reflect the light at least twice so that the path for the light to travel in the light path turning module is increased. Accordingly, a high-level long focus lens with a longer effective focal length (EFL) and a longer back focal length (BFL) can be installed in a limited space, the space utilization can be effectively promoted, miniaturization of the lens device can be achieved, the lens device is capable of good optical performance, and the requirements of image forming of an optical lens device can be met.

BRIEF DESCRIPTION OF THE DRAWINGS

A detailed description is given in the following embodiments with reference to the accompanying drawings, wherein.

DETAILED DESCRIPTION OF THE INVENTION

Figure 1:
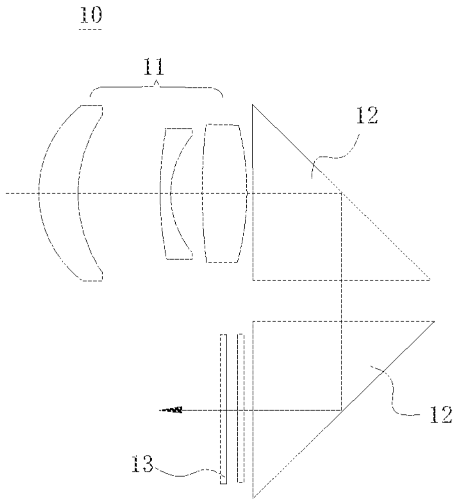
Fig. 1 (PRIOR ART)
FIG. 1 is a schematic view of a periscope lens device of the prior art.

The purpose, technical scheme and merits of the invention can be more fully understood by reading the subsequent detailed description and embodiments with references made to the accompanying drawings. However, it is understood that the subsequent detailed description and embodiments are only used for describing the invention. The invention is not limited thereto.

In the following descriptions, when an element is "fixed to" or "disposed on" another element, it is indicated that an element is fixed to or be disposed on another element directly or indirectly. Similarly, when an element is "connected to" another element, it is indicated that an element is connected to another element directly or indirectly.

It is to be understood that the terms "length", "width", "upper", "lower", "front", "rear", "left", "right", "vertical", "horizontal", "top", "bottom", "inner", "outer" and so on, are used for indicating the orientations or positions based on the relationship of elements shown in the drawings for convenience and simplification of description only, without indicating or implying that the device or elements referred thereto must have a particular orientation and the orientation of a particular configuration and operation, and thus those should not be construed as limiting the invention.

Further, the terms "first" and "second" are used only for the purpose of descriptions, without indicating or implying the relative importance or the number of technical features. Therefore, "first" or "second" used before a feature may indicate or imply one or more described features. In the descriptions of the invention, the term "plural" means two or more than two, unless otherwise specified.

Figure 2:
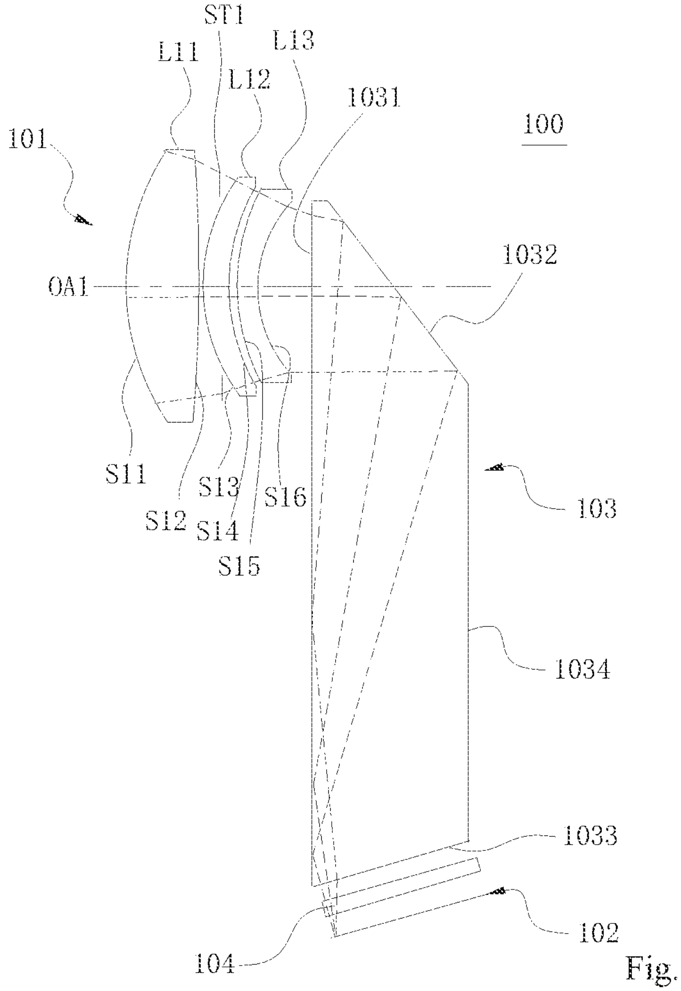
FIG. 2 is a schematic view of a lens device in accordance with a first embodiment of the invention.

FIG. 2 is a schematic view of a lens device 100 in accordance with a first embodiment of the invention. As shown in FIG. 2, the lens device 100 includes a lens module 101, an image forming unit 102, and a light path turning module 103 disposed between the lens module 101 and the image forming unit 102. The lens module 101 has an optical axis OA1 extending in a first direction. The lens module 101 is movable in the first direction to perform auto focus operation and is movable in a second direction and/or a third direction to perform vibration compensation operation, wherein the second direction and the third direction are perpendicular to the first direction. In operation, light emitted from the lens module 101 reaches the light path turning module 103, experiences two reflections in the light path turning module 103, and is emitted from the light path turning module 103 to form an image on the image forming unit 102.

The lens module 101 includes a first lens L11, a second lens L12 and a third lens L13 which are arranged in order along the optical axis OA1 from an object side to an image side. The lens module 101 further includes an aperture stop ST1 disposed between the first lens L11 and the second lens L12. The first lens L11 is with positive refractive power, and has an object side surface S11 that is a convex surface and an image side surface S12 that is also a convex surface. The object side surface S11 and the image side surface S12 of the first lens L11 are aspherical. The first lens L11 is made of glass. Both surfaces SST1 of the aperture stop ST1, not labeled in FIG. 2 but shown in Table 1, are planar. The second lens L12 is with positive refractive power, and has an object side surface S13 that is a convex surface and an image side surface S14 that is a concave surface. The object side surface S13 and the image side surface S14 of the second lens L12 are aspherical. The second lens L12 is made of plastic. The third lens L13 is with negative refractive power, and has an object side surface S15 that is a convex surface and an image side surface S16 that is a concave surface. The object side surface S15 and the image side surface S16 of the third lens L13 are aspherical. The third lens L13 is made of plastic.

The first lens L11, the second lens L12 and the third lens L13 are arranged in order along the optical axis OA1 from the object side to the image side. The lens device 100 satisfies at least one following condition:

$$-10 < M1T - (L1\phi + L2\phi + L3\phi) < 10, \quad (1)$$

$$1 < M1T/GP1T < 10, \quad (2)$$

$$0 < (f1 + f2 + f3)/TTL < 28, \quad (3)$$

$$-1 < (R1 + R2)/(R3 + R4) < 3, \quad (4)$$

$$0.25 \leqq Dm1/EFL \leqq 0.65, \quad (5)$$

$$0.2 \leqq Dm2/EFL \leqq 0.7, \quad (6)$$

wherein L1Ø is an effective diameter of the object side surface of the first lens; L2Ø is an effective diameter of the object side surface of the second lens; L3Ø is an effective diameter of the object side of the third lens; M1T is a central thickness of the light path turning module, namely a total length of a path along which the light travels from a light incident surface of the light path turning module to a light emitting surface of the light path turning module; GP1T is a central distance from an intersection between the object side surface of the first lens and the optical axis to the light path turning module, namely a distance measured along the optical axis from the object side surface of the first lens to the light incident surface of the light path turning module; f1 is a focal length of the first lens; f2 is a focal length of the second lens; f3 is a focal length of the third lens; TTL is an optical total length along the optical axis from the object side surface of the first lens to an image forming plane, namely the total length of the path along which the light travels from the object side surface of the first lens to the image forming surface; R1 is a radius of curvature of the object side surface of the first lens; R2 is a radius of curvature of the image side surface of the first lens; R3 is a radius of curvature of the object side surface of the second lens; R4 is a radius of curvature of an image side surface of the second lens; Dm1 is a maximum diameter of the object side surface of the first lens for incidence of the light, namely a maximum optical effective diameter of the object side surface of the first lens; Dm2 is a maximum diameter of the image side surface of the first lens for incidence of the light, namely a maximum optical effective diameter of the image side surface of the first lens. When at least one of the above-mentioned conditions (1) and (2) is satisfied, the required optical performance can be maintained and the refractive power of the system can be effectively arranged thereby reducing the sensitiveness of the system. When at least one of the above-mentioned conditions (3) and (4) is satisfied, the refractive power of the system can be effectively arranged thereby reducing the sensitiveness of the system. When at least one of the above-mentioned conditions (5) and (6) is satisfied, the overall size of the lens device can be effectively controlled and the lens device is still capable of good optical performance. The preferred embodiment of the present invention can be achieved when the lens assembly satisfies at least one of the conditions (1)-(6). The suboptimal embodiment of the present invention can be achieved when the lens assembly satisfies the conditions (3) (6), which still have the above-mentioned advantages, namely the thickness of the light path turning module and the optical total length (TTL) are reduced, the optical performance is promoted, and the cost of materials is reduced.

In the first embodiment depicted by the figure, the light path turning module 103 includes a light incident surface 1031 on which the light emitted from the lens module 101 is incident (in the first embodiment depicted by the figure, the light is incident on the light incident surface 1031 at a right angle), a first light reflective surface 1032 reflecting the light incident on the light incident surface 1031 back to the light incident surface 1031, and a light emitting surface 1033 allowing the light to pass through after the light reflected back to the light incident surface 1031 is reflected on the light incident surface 1031. After passing through the light emitting surface 1033, the light enters the image forming unit 102. An optical filter 104 may be disposed between the image forming unit 102 and the light path turning module 103. The light emitting surface 1033 is disposed towards the image forming unit 102 so that the light emitted from the light emitting surface 1033 can reach the image forming unit 102. The light incident surface 1031 is disposed adjacent to the first light reflective surface 1032 and the light emitting surface 1033. However, the invention is not limited thereto. For example, the light incident surface 1031 can be connected to the first light reflective surface 1032 and the light emitting surface 1033 through other surfaces. A connecting surface 1034 is disposed between the first light reflective surface 1032 and the light emitting surface 1033. Further, the connecting surface 1034 is disposed close to the edge of the first light reflective surface 1032 where the light is reflected. Such arrangement is advantageous to reduction of the thickness of the light path turning module 103. The light path turning module 103 can be implemented in other forms which will be described in detail later.

The lens module 101 is disposed at a side of the light incident surface 1031, aside from the center of the light incident surface 1031, and near an edge of the light incident surface 1031. In the first embodiment depicted by the figure, the lens module 101 is disposed at a side of the light incident surface 1031 and distant from the image forming unit 102. Such arrangement is advantageous to increasing the back focal length of the lens device 100.

Table 1 shows the optical specification of the lens device 100, in which the included angle between the first light reflective surface 1032 and the light incident surface 1031 is −37°, the included angle between the light emitting surface 1033 and the light incident surface 1031 is 74°, and the light incident surface 1031 is used as a reference surface and is defined as 0°.

TABLE 1

| Effective Focal Length = 11.78 mm F-number = 2.8<br>Optical Total Length (TTL) = 14.898 mm Field of View = 19.65 degrees | | | | | | | |
|---|---|---|---|---|---|---|---|
| Surface Number | Radius of Curvature (mm) | Thickness (mm) | Nd | Vd | Effective Diameter (mm) | Effective Focal Length (mm) | Remark |
| S11 | 3.926 | 1.2 | 1.54 | 56.1 | 4.4 | 5.689 | L11 |
| S12 | −12.303 | 0.32 | | | 4.13 | | |
| SST1 | ∞ | −0.25 | | | 3.71 | | ST1 |
| S13 | 3.852 | 0.41 | 1.67 | 19.2 | 3.5 | 21.03 | L12 |
| S14 | 5.052 | 0.12 | | | 3.22 | | |
| S15 | 2.584 | 0.3 | 1.67 | 19.2 | 3.15 | −4.891 | L13 |
| S16 | 1.384 | 0.9 | | | 2.76 | | |
| S17 | ∞ | 1.323 | 1.66 | 50.9 | 2.82 | | 1031 |
| S18 | ∞ | 4.8 | | | 3.56 | | 1032 |
| S19 | ∞ | 4.877 | | | 10.2 | | 1031 |
| S110 | | 0.3 | | | | | 1033 |
| S111 | ∞ | 0.21 | 1.52 | 61.2 | | | 104 |
| S112 | ∞ | 0.388 | | | | | |

The aspheric surface sag z of each aspheric lens in Table 1 can be calculated by the following formula:

$$z=ch^2/\{1+[1-(k+1)c^2h^2]^{1/2}\}+Ah^4+Bh^6+Ch^8+Dh^{10}+Eh^{12}+Fh^{14}+Gh^{16}+Hh^{18}+Ih^{20},$$

where c is curvature, h is the vertical distance from the lens surface to the optical axis, k is conic constant, and A, B, C, D, E, F, G, H and I are aspheric coefficients. In the first embodiment, the conic constant k and the aspheric coefficients A, B, C, D, E, F, G, H and I of each aspheric lens are shown in Table 2.

TABLE 2

| Surface Number | k<br>E | A<br>F | B<br>G | C<br>H | D<br>I |
|---|---|---|---|---|---|
| S11 | −2.94E−01 | −3.82E−04 | 1.35E−04 | −1.21E−05 | 1.10E−08 |
| | 7.57E−08 | −3.78E−09 | −2.22E−10 | 0.00E+00 | 0.00E+00 |
| | −2.03E+02 | 1.01E−03 | 3.48E−06 | −1.51E−05 | −8.72E−07 |
| | 1.02E−07 | 2.77E−08 | −2.50E−09 | 0.00E+00 | 0.00E+00 |
| S13 | 1.86E+00 | 2.85E−03 | −5.24E−05 | −3.26E−05 | 4.97E−06 |
| | −1.41E−06 | 9.02E−08 | 4.45E−09 | 0.00E+00 | 0.00E+00 |
| S14 | −8.88E+00 | 1.07E−02 | −2.11E−03 | 3.77E−04 | −1.28E−05 |
| | 1.43E−06 | 1.57E−06 | −3.89E−07 | 0.00E+00 | 0.00E+00 |
| S15 | 1.45E+00 | −6.49E−03 | −1.38E−03 | 5.42E−04 | 3.90E−05 |
| | −1.64E−05 | 1.64E−06 | −2.62E−07 | 0.00E+00 | 0.00E+00 |
| S16 | −9.72E+00 | −1.61E−02 | 1.48E−03 | 4.35E−04 | −3.67E−05 |
| | −6.19E−06 | −3.05E−06 | 4.54E−07 | 0.00E+00 | 0.00E+00 |

Table 3 shows the parameters and condition values for conditions (1)-(6) in accordance with the first embodiment of the invention. It can be seen from Table 3 that the lens device 100 of the first embodiment satisfies the conditions (1)-(6).

TABLE 3

| | | | | | |
|---|---|---|---|---|---|
| L1Ø (mm) | 4.4 | L2Ø (mm) | 3.5 | L3Ø (mm) | 3.15 |
| M1T (mm) | 11 | GP1T(mm) | 1.2 + 0.32 − 0.25 + 0.41 + 0.12 + 0.3 + 0.9 = 3 | | |
| M1T − (L1Ø + L2Ø + L3Ø) | | −0.05 | M1T/GP1T | | 3.667 |
| f1 (mm) | 5.689 | f2 (mm) | 21.03 | f3 (mm) | −4.891 |
| Dm1 (mm) | 4.4 | Dm2 (mm) | 4.13 | | |
| (f1 + f2 + f3)/TTL | | 1.465 | (R1 + R2)/(R3 + R4) | | −0.94 |
| Dm1/EFL | | 0.373 | Dm2/EFL | | 0.350 |

Figure 3A:
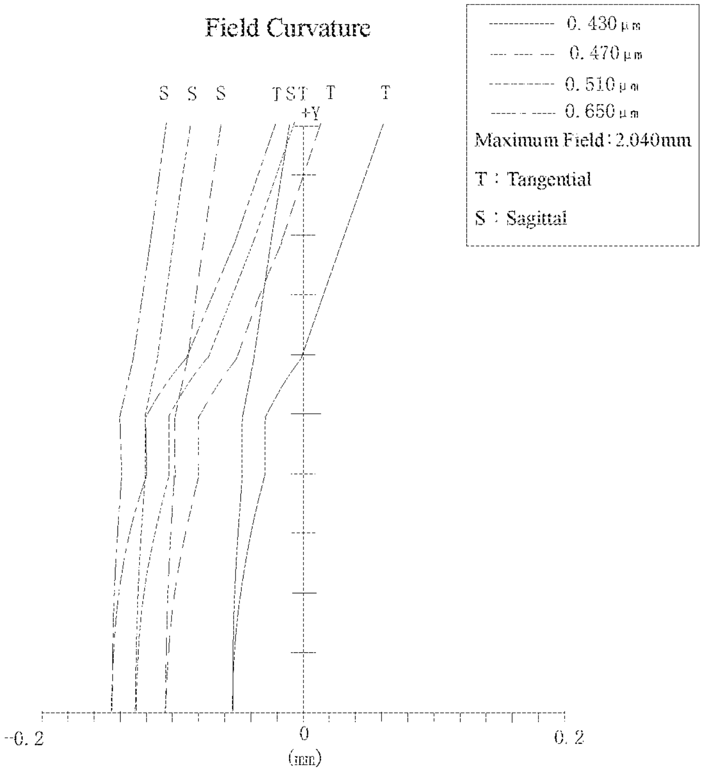
FIGS. 3A, 3B and 3C are respectively a field curvature diagram, a distortion diagram and a modulation transfer function diagram of the lens device in accordance with the first embodiment of the invention.
Figure 3B:
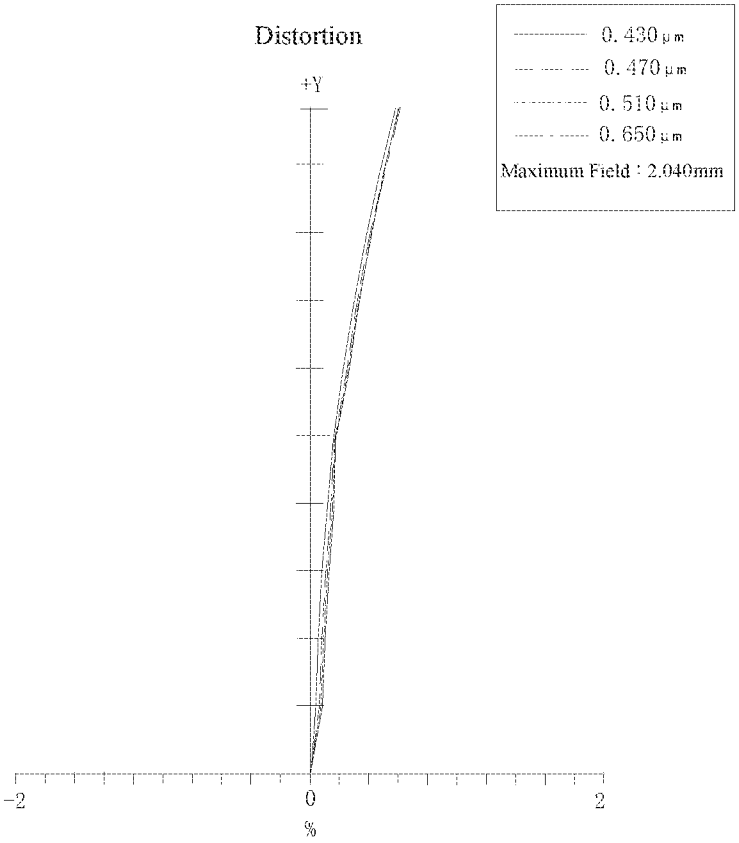
Figure 3C:
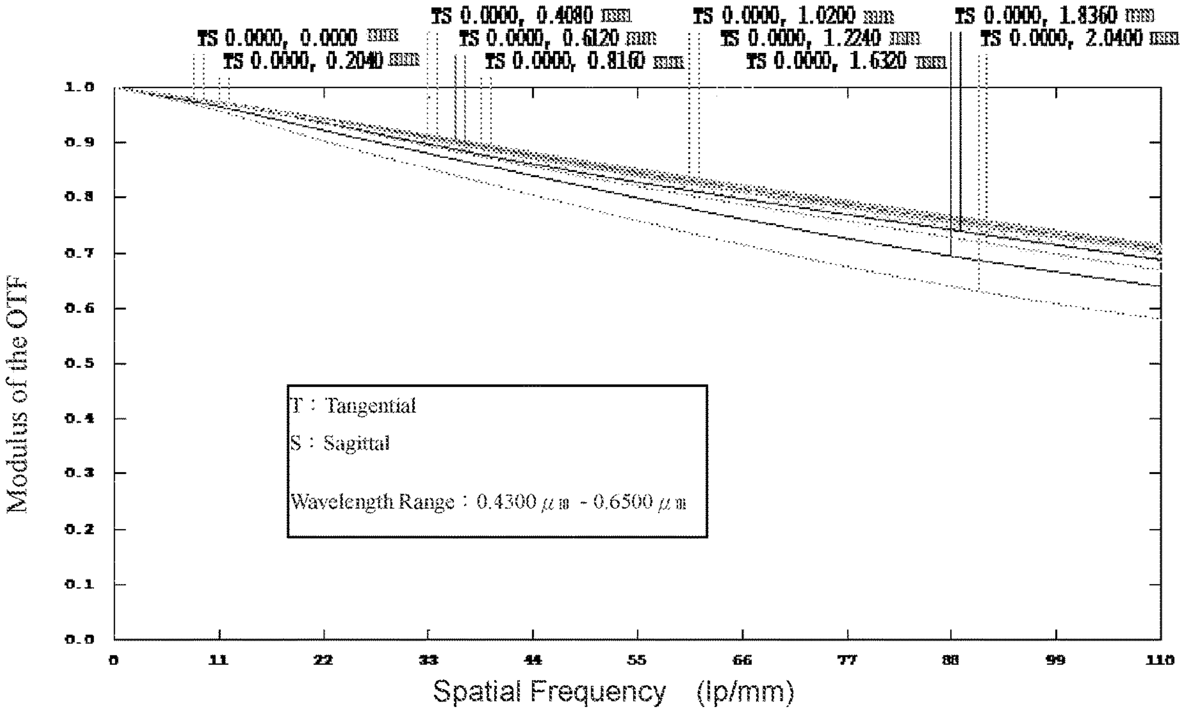

In addition, the lens device 100 of the first embodiment can meet the requirements of optical performance as seen in FIGS. 3A-3C. It can be seen from FIG. 3A that the field curvature of tangential direction and sagittal direction in the lens device 100 of the first embodiment ranges from −0.12 mm to 0.1 mm. It can be seen from FIG. 3B that the distortion in the lens device 100 of the first embodiment ranges from 0% to −0.6%. It can be seen from FIG. 3C that the modulation transfer function of tangential direction and sagittal direction in the lens device 100 of the first embodiment ranges from 0.70 to 1.0. It is obvious that the field curvature and the distortion of the lens device 100 of the first embodiment can be effectively corrected, and the image resolution can meet the requirements. Therefore, the lens device 100 of the first embodiment is capable of good optical performance.

In the first embodiment, the lens device 100 has three lenses, an aperture stop disposed between the lenses, and a light path turning module 103 configured to reflect the light twice. By such arrangement, the space utilization is effectively improved and the back focal length is increased. Further, the glass lens and the plastic lens are combined to be used. By such arrangement, the optical total length (TTL) is reduced, the optical performance is promoted, and the cost of materials is reduced.

Figure 4:
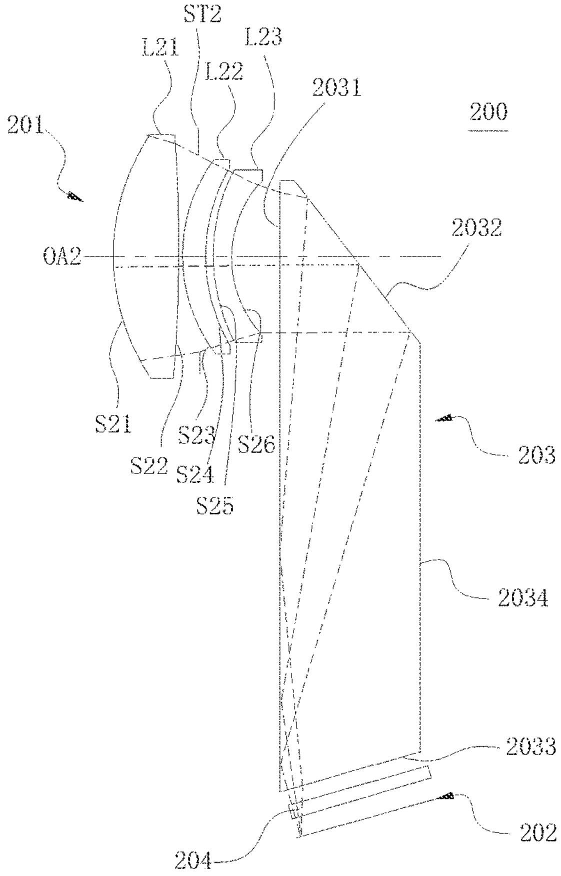
FIG. 4 is a schematic view of a lens device in accordance with a second embodiment of the invention.

FIG. 4 is a schematic view of a lens device 200 in accordance with a second embodiment of the invention. A part of the second embodiment is same as that of the first embodiment and therefore the descriptions thereof are omitted. As shown in FIG. 4, the lens device 200 includes a lens module 201, an image forming unit 202, and a light path turning module 203 disposed between the lens module 201 and the image forming unit 202. The lens module 201 has an optical axis OA2 extending in the first direction. The lens module 201 is movable in the first direction to perform auto focus operation and is movable in a second direction and/or a third direction to perform vibration compensation operation, wherein the second direction and the third direction are perpendicular to the first direction. In operation, light emitted from the lens module 201 reaches the light path turning module 203, experiences two reflections in the light path turning module 203, and is emitted from the light path turning module 203 to form an image on the image forming unit 202.

The lens module 201 includes a first lens L21, a second lens L22 and a third lens L23 which are arranged in order along the optical axis OA2 from an object side to an image side. The lens module 201 further includes an aperture stop ST2 disposed between the first lens L21 and the second lens L22. The first lens L21 is with positive refractive power, and has an object side surface S21 that is a convex surface and an image side surface S22 that is a concave surface. The object side surface S21 and the image side surface S22 of the first lens L21 are aspherical. The first lens L11 is made of plastic. Both surfaces SST2 of the aperture stop ST2, not labeled in FIG. 4 but shown in Table 4, are planar. The second lens L22 is with negative refractive power, and has an object side surface S23 that is a convex surface and an image side surface S24 that is a concave surface. The object side surface S23 and the image side surface S24 of the second lens L22 are aspherical. The second lens L22 is made of plastic. The third lens L23 is with positive refractive power, and has an object side surface S25 that is a convex surface and an image side surface S26 that is also a convex surface. The object side surface S25 and the image side surface S26 of the third lens L23 are aspherical. The third lens L23 is made of glass.

In the second embodiment depicted by the figure, the light path turning module 203 includes a light incident surface 2031 on which the light emitted from the lens module 201 is incident, a first light reflective surface 2032 reflecting the light incident on the light incident surface 2031 back to the light incident surface 2031, and a light emitting surface 2033 allowing the light to pass through after the light reflected back to the light incident surface 2031 is reflected on the light incident surface 2031. After passing through the light emitting surface 2031, the light enters the image forming unit 202. An optical filter 204 may be disposed between the image forming unit 202 and the light path turning module 203. The light emitting surface 2033 is disposed towards the image forming unit 202 so that the light emitted from the light emitting surface 2033 can reach the image forming unit 202. A connecting surface 2034 is disposed between the first light reflective surface 2032 and the light emitting surface 2033. Further, the connecting surface 2034 is disposed close to the edge of the first light reflective surface 2032 where the light is reflected. Such arrangement is advantageous to reduction of the thickness of the light path turning module 203. The light path turning module 203 can be implemented in other forms which will be described in detail later.

The lens module 201 is disposed at a side of the light incident surface 2031, aside from the center of the light incident surface 2031, and near an edge of the light incident surface 2031. In the second embodiment depicted by the figure, the lens module 201 is disposed at a side of the light incident surface 2031 and distant from the image forming unit 202. Such arrangement is advantageous to increasing the back focal length of the lens device 200.

Table 4 shows the optical specification of the lens device 200, in which the included angle between the first light reflective surface 2032 and the light incident surface 2031 is −37°, the included angle between the light emitting surface 2033 and the light incident surface 2031 is 74°, and the light incident surface 2031 is used as a reference surface and is defined as 0°.

TABLE 4

Effective Focal Length = 14.084 mm F-number = 2.2
Optical Total Length (TTL) = 22.766 mm Field of View = 26.1 degrees

| Surface Number | Radius of Curvature (mm) | Thickness (mm) | Nd | Vd | Effective Diameter (mm) | Effective Focal Length (mm) | Remark |
|---|---|---|---|---|---|---|---|
| S21 | 6.263 | 0.865 | 2 | 19.3 | 6.4 | 7.828 | L21 |
| S22 | 27.925 | 0.25 | | | 6.28 | | |
| SST2 | | 0.224 | | | 6.26 | | ST2 |
| S23 | 12.609 | 0.348 | 1.67 | 19.2 | 6.09 | −5.186 | L22 |
| S24 | 2.718 | 0.641 | | | 5.36 | | |
| S25 | 7.464 | 0.853 | 1.87 | 48.5 | 5.36 | 8.2 | L23 |
| S26 | −148.43 | 0.2 | | | 5.33 | | |
| S27 | ∞ | 2.3 | 1.74 | 50 | 5.35 | | 2031 |
| S28 | ∞ | −8.43 | | | 6.72 | | 2032 |
| S29 | ∞ | 7.865 | | | 19.68 | | 2031 |
| S210 | | 0.3 | | | | | 2033 |
| S211 | ∞ | 0.21 | 1.52 | 61.2 | | | 204 |
| S212 | ∞ | 0.28 | | | | | |

The definition of aspheric surface sag z of each aspheric lens in Table 4 is same as that in Table 1 and therefore the descriptions thereof are omitted. In the second embodiment, the conic constant k and the aspheric coefficients A, B, C, D, E, F, G, H and I of each aspheric lens are shown in Table 5.

TABLE 5

| Surface Number | k<br>E | A<br>F | B<br>G | C<br>H | D<br>I |
|---|---|---|---|---|---|
| S21 | −4.08E−01 | −1.63E−03 | 1.39E−05 | −8.76E−07 | 2.12E−07 |
| | 4.81E−09 | −1.49E−08 | 1.15E−09 | 0.00E+00 | 0.00E+00 |
| S22 | −2.21E+01 | −2.68E−05 | 6.31E−06 | 8.69E−06 | −1.49E−06 |
| | 1.02E−08 | 1.42E−11 | 7.05E−10 | 0.00E+00 | 0.00E+00 |
| S23 | 1.29E+01 | −3.29E−03 | 2.77E−05 | 1.22E−05 | −1.72E−06 |
| | 1.87E−07 | 1.70E−08 | −1.34E−09 | 0.00E+00 | 0.00E+00 |
| S24 | −1.22E−01 | −6.40E−03 | −7.07E−04 | −5.77E−05 | 4.66E−07 |
| | 2.75E−07 | 9.10E−08 | −1.96E−08 | 0.00E+00 | 0.00E+00 |
| S25 | 5.23E+00 | 2.67E−03 | −2.03E−04 | 2.76E−07 | −6.01E−06 |
| | 3.89E−08 | 6.85E−08 | −1.55E−08 | 0.00E+00 | 0.00E+00 |
| S26 | 3.77E+02 | 1.80E−03 | 1.91E−04 | −1.93E−05 | 4.12E−06 |
| | 3.47E−07 | −2.53E−07 | 1.19E−08 | 0.00E+00 | 0.00E+00 |

Table 6 shows the parameters and condition values for conditions (1)-(6) in accordance with the second embodiment of the invention. It can be seen from Table 6 that the lens device 200 of the second embodiment satisfies the conditions (1)-(6).

TABLE 6

| | | | | | |
|---|---|---|---|---|---|
| L1Ø (mm) | 6.4 | L2Ø (mm) | 6.09 | L3Ø (mm) | 5.36 |
| M1T (mm) | 18.595 | GP1T(mm) | 0.865 + 0.25 + 0.224 + 0.348 + 0.641 + 0.853 + 0.2 = 3.38 | | |
| M1T − (L1Ø + L2Ø + L3Ø) | 0.745 | | M1T/GP1T | | 5.502 |
| f1 (mm) | 7.828 | f2 (mm) | −5.186 | f3 (mm) | 8.2 |
| Dm1 (mm) | 6.4 | Dm2 (mm) | 6.28 | | |
| (f1 + f2 + f3)/TTL | | 0.476 | (R1 + R2)/(R3 + R4) | | 2.23 |
| Dm1/EFL | | 0.454 | Dm2/EFL | | 0.446 |

In addition, the lens device 200 of the second embodiment can meet the requirements of optical performance. According to experiments, the field curvature of tangential direction and sagittal direction in the lens device 200 of the second embodiment ranges from −0.08 mm to 0.12 mm, the distortion in the lens device 200 of the second embodiment ranges from 0% to −0.6%, and the modulation transfer function of tangential direction and sagittal direction in the lens device 200 of the second embodiment ranges from 0.70 to 1.0. It is obvious that the field curvature and the distortion of the lens device 200 of the second embodiment can be effectively corrected, and the image resolution can meet the requirements. Therefore, the lens device 200 of the second embodiment is capable of good optical performance.

In the second embodiment, the lens device 200 has three lenses, an aperture stop disposed between the lenses, and a light path turning module 203 configured to reflect the light twice. By such arrangement, the space utilization is effectively improved and the back focal length is increased. Further, the glass lens and the plastic lens are combined to be used. By such arrangement, the optical total length (TTL) is reduced, the optical performance is promoted, and the cost of materials is reduced.

Figure 5A:
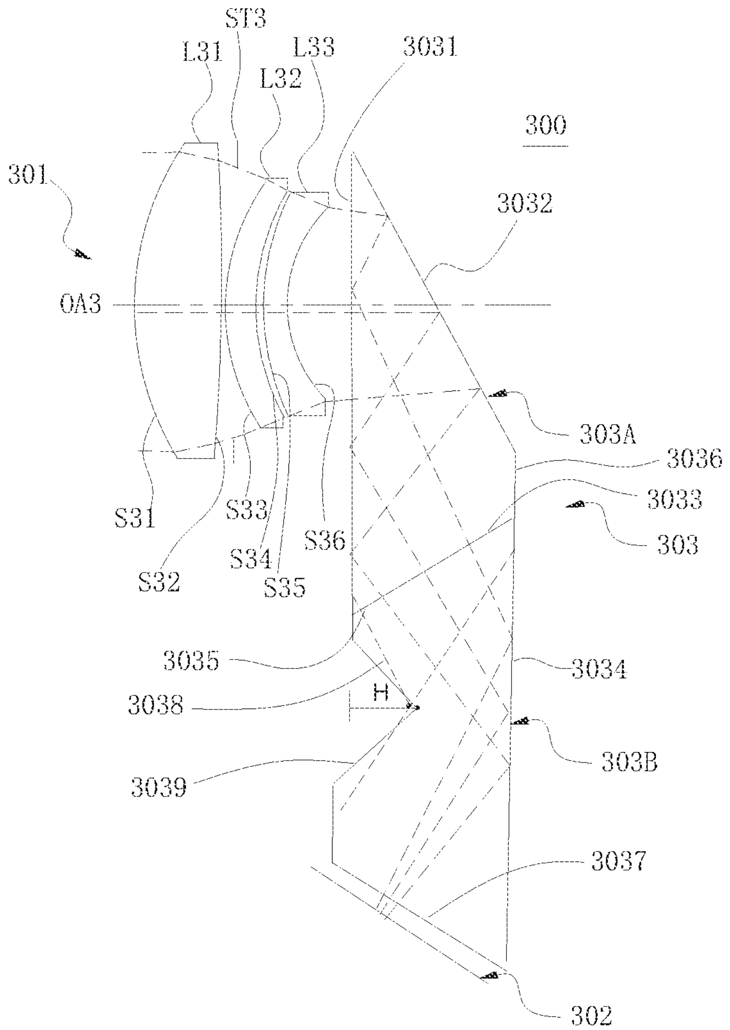
FIG. 5A is a schematic view of a lens device in accordance with a third embodiment of the invention.

FIG. 5A is a schematic view of a lens device 300 in accordance with a third embodiment of the invention. A part of the third embodiment is same as that of the first embodiment and therefore the descriptions thereof are omitted. As shown in FIG. 5A, the lens device 300 includes a lens module 301, an image forming unit 302, and a light path turning module 303 disposed between the lens module 301 and the image forming unit 302. The lens module 301 has an optical axis OA3 extending in the first direction. The lens module 301 is movable in the first direction to perform auto focus operation and is movable in a second direction and/or a third direction to perform vibration compensation operation, wherein the second direction and the third direction are perpendicular to the first direction. In operation, light emitted from the lens module 301 reaches the light path turning module 303, experiences three reflections in the light path turning module 303, and is emitted from the light path turning module 303 to form an image on the image forming unit 302.

The lens module 301 includes a first lens L31, a second lens L32 and a third lens L33 which are arranged in order along the optical axis OA3 from an object side to an image side. The lens module 301 further includes an aperture stop ST3 disposed between the first lens L31 and the second lens L32. The first lens L31 is with positive refractive power, and has an object side surface S31 that is a convex surface and an image side surface S32 that is also a convex surface. The object side surface S31 and the image side surface S32 of the first lens L31 are aspherical. The first lens L31 is made of glass. Both surfaces SST3 of the aperture stop ST3, not labeled in FIG. 5A but shown in Table 7, are planar. The second lens L32 is with positive refractive power, and has an object side surface S33 that is a convex surface and an image side surface S34 that is a concave surface. The object side surface S33 and the image side surface S34 of the second lens L32 are aspherical. The second lens L32 is made of plastic. The third lens L33 is with negative refractive power, and has an object side surface S35 that is a convex surface and an image side surface S36 that is a concave surface. The object side surface S35 and the image side surface S36 of the third lens L33 are aspherical. The third lens L33 is made of plastic.

The first lens L31, the second lens L32 and the third lens L33 are arranged in order along the optical axis OA3 from an object side to an image side. In the third embodiment depicted by the figure, the light path turning module 303 includes a first light path turning element 303A and a second light path turning element 303B. The first light path turning element 303A includes a light incident surface 3031 on which the light emitted from the lens module 301 is incident at a right angle, a first light reflective surface 3032 reflecting the light back to the light incident surface 3031 after the light is incident on the light incident surface 3031, and a light emitting surface 3033 allowing the light to pass through after the light reflected back to the light incident surface 3031 is reflected on the light incident surface 3031. After passing through the light emitting surface 3033, the light enters the second light path turning element 303B. The second light path turning element 303B includes a second light incident surface 3035 allowing the light emitted from the light emitting surface 3033 to pass through, a second light reflective surface 3034 reflecting the light that passes through the second light incident surface 3035, and a second light emitting surface 3037. The second light incident surface 3035 of the second light path turning element 303B and the light emitting surface 3033 of the first light path turning element 303A are disposed in contact with each other to form a plane. In operation, the light is incident on the light incident surface 3031, reaches and is reflected on the first light reflective surface 3032, reaches and is reflected on the light incident surface 3031, passes through the light emitting surface 3033 and the second light incident surface 3035, reaches and is reflected on the second light reflective surface 3034, and is emitted from the second light emitting surface 3037. The lens module 301 is disposed at a side of the light incident surface 3031 and distant from the image forming unit 302.

In the third embodiment depicted by the figure, the light incident surface 3031 is disposed adjacent to the first light reflective surface 3032 and the light emitting surface 3033. However, the invention is not limited thereto. For example, the light incident surface 3031 can be connected to the first light reflective surface 3032 and the light emitting surface 3033 through other surfaces. Similarly, the second light reflective surface 3034 may be disposed adjacent to the second light incident surface 3035 and the second light emitting surface 3037 or may be connected to the second light incident surface 3035 and the second light emitting surface 3037 through other surfaces. The second light emitting surface 3037 and the second light incident surface 3035 have a first connecting surface 3038 and a second connecting surface 3039 connected therebetween. The first connecting surface 3038 and the second connecting surface 3039 have an included angle $\alpha$ therebetween, wherein the included angle $\alpha$ is defined in the light path turning module 303 and is directed to the light incident surface 3031. It is preferred that $180° \leq \alpha < 270°$. However, the included angle $\alpha$ is not limited thereto. The included angle $\alpha$ may be greater than or equal to 270°.

Figure 5B:
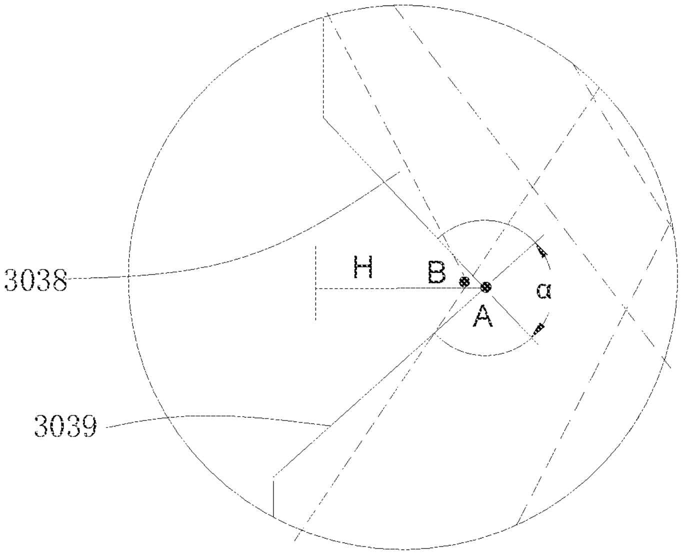
FIG. 5B is an enlarged local view of FIG. 5A.

The first connecting surface 3038 and the second connecting surface 3039 are formed into a concave structure of the light path turning module 303. The junction point A of the first connecting surface 3038 and the second connecting surface 3039 has a depth H and is slightly deeper than the intersection B of the peripheral light reflected by the light incident surface 3031 and the peripheral light reflected by the first light reflective surface 3032. Referring to FIG. 5B, the first connecting surface 3038 is configured to block a part of peripheral light reflected by the first light reflective surface 3032 and a part of peripheral light reflected by the light incident surface 3031. Since each blocked part is on two sides of the peripheral light, ghost images can be effectively reduced.

It is preferred that at least one of the first connecting surface 3038 and the second connecting surface 3039 has a light absorbing film attached thereto. The light absorbing film may be made of black light-proof material that is coated on at least one of the first connecting surface 3038 and the second connecting surface 3039, or may be a light-proof sheet attached to the first connecting surface 3038 and the second connecting surface 3039 through adhesive.

It is understood that the second light incident surface 3035 and the first connecting surface 3038 may have a third connecting surface connected therebetween, and the second light emitting surface 3037 and the second connecting surface 3039 may have a fourth connecting surface connected therebetween.

The first light path turning element 303A further includes a fifth connecting surface 3036 which is connected between the first light reflective surface 3032 and the light emitting surface 3033. Further, the fifth connecting surface 3036 is disposed close to the edge of the first light reflective surface 3032 where the light is reflected. It is preferred that the fifth connecting surface 3036 and the second light reflective surface 3034 are placed to be coplanar. Such arrangement is advantageous to reduction of the thickness of the light path turning module 303.

Further, the first light path turning element 303A and the second light path turning element 303B may be integrally formed as a continuous-unity piece. Under such circumstance, the first connecting surface 3038 and the second connecting surface 3039 are formed on the light incident surface 3031. The light path turning module 303 can be implemented in other forms which will be described in detail later.

The lens module 301 is disposed at a side of the light incident surface 3031, aside from the center of the light incident surface 3031, and near an edge of the light incident surface 3031. In the third embodiment depicted by the figure, the lens module 301 is disposed at a side of the light incident surface 3031 and distant from the image forming unit 302. Such arrangement is advantageous to increasing the back focal length of the lens device 300.

Table 7 shows the optical specification of the lens device 300, in which most data are identical to those of the first embodiment. For the lens device 300, the included angle between the first light reflective surface 3032 and the light incident surface 3031 is −29°, the included angle between the light emitting surface 3033 and the light incident surface 3031 is 58°, the included angle between the second light incident surface 3035 and the light incident surface 3031 is 58°, the included angle between the second light reflective surface 3034 and the light incident surface 3031 is 0°, and the included angle between the second light emitting surface 3037 and the light incident surface 3031 is −29°. The light path turning module 303 is substantially parallelogram. The light incident surface 3031 is used as a reference surface and is defined as 0°.

TABLE 7

Effective Focal Length = 11.78 mm F-number = 2.8
Optical Total Length (TTL) = 14.89 mm Field of View = 11.86 degrees

| Surface Number | Radius of Curvature (mm) | Thickness (mm) | Nd | Vd | Effective Diameter (mm) | Effective Focal Length (mm) | Remark |
|---|---|---|---|---|---|---|---|
| S31 | 3.926 | 1.2 | 1.54 | 56.1 | 4.4 | 5.69 | L31 |
| S32 | −12.303 | 0.32 | | | 4.11 | | |
| SST3 | ∞ | −0.25 | | | 3.71 | | ST3 |
| S33 | 3.852 | 0.41 | 1.67 | 19.2 | 3.5 | 21.03 | L32 |
| S34 | 5.052 | 0.12 | | | 3.22 | | |
| S35 | 2.584 | 0.3 | 1.67 | 19.2 | 3.15 | −4.89 | L33 |
| S36 | 1.384 | 0.9 | | | 2.76 | | |
| S37 | ∞ | 1.223 | 1.66 | 50.9 | 4.50 | | 303A<br>3031 |
| S38 | ∞ | 2.31 | | | 5 | | 3032 |
| S39 | ∞ | 2.1 | | | 5 | | 3031 |
| S310 | ∞ | 2.3 | 1.66 | 50.9 | 3.6 | | 303B<br>3035 |
| S311 | ∞ | 3.067 | | | 7.6 | | 3034 |
| S312 | | 0.3 | | | | | 3037 |
| S313 | | 0.21 | 1.52 | 64.2 | | | |
| S314 | | 0.388 | | | | | |

The definition of aspheric surface sag z of each aspheric lens in Table 7 can be calculated by the following formula:

$$Z=ch^2/\{1+[1-(k+t)c^2h^2]^{1/2}\}+Ah^4+Bh^6+Ch^8+Dh^{10}+Eh^{12}+Fh^{14}+Gh^{16}$$

where c is curvature, h is the vertical distance from the lens surface to the optical axis, k is conic constant, and A, B, C, D, E, F and G are aspheric coefficients. In the third embodiment, the conic constant k and the aspheric coefficients A, B, C, D, E, F and G of each aspheric lens are shown in Table 8.

TABLE 8

| Surface Number | k<br>E | A<br>F | B<br>G | C | D |
|---|---|---|---|---|---|
| S31 | −0.2935445 | −0.000381576 | 0.000134973 | −1.21E−05 | 1.10E−08 |
| | 7.57E−08 | −3.78E−09 | −2.22E−10 | | |
| S32 | −202.8148 | 0.001014641 | 3.48E−06 | −1.51E−05 | −8.72E−07 |
| | 1.02E−07 | 2.77E−08 | −2.50E−09 | | |
| S33 | 1.861245 | 0.002845361 | −5.24E−05 | −3.26E−05 | 4.97E−06 |
| | −1.41E−06 | 9.02E−08 | 4.45E−09 | | |
| S34 | −8.875527 | 0.01065182 | −0.002112215 | 0.000377228 | −1.28E−05 |
| | 1.43E−06 | 1.57E−06 | −3.89E−07 | | |
| S35 | −1.452457 | −0.00649403 | −0.001382383 | 0.0005423 | 3.90E−05 |
| | −1.64E−05 | 1.64E−06 | −2.62E−07 | | |
| S36 | −0.9722836 | −0.016082342 | 0.001475289 | 0.000434714 | −3.67E−05 |
| | −6.19E−06 | −3.05E−06 | 4.54E−07 | | |

Table 9 shows the parameters and condition values for conditions (1)-(6) in accordance with the third embodiment of the invention. It can be seen from Table 9 that the lens device 300 of the third embodiment satisfies the conditions (1)-(6).

TABLE 9

| | | | | | | | |
|---|---|---|---|---|---|---|---|
| f1 (mm) | 5.69 | f2(mm) | | | 21.03 | f3 (mm) | −4.89 |
| TTL (mm) | 14.89 | R1(mm) | | | 6.263 | R2(mm) | 27.925 |
| R3(mm) | 12.609 | R4(mm) | | | | 2.718 | |
| (f1 + f2 + f3)/TTL | | 1.47 | | | | (R1 + R2)/(R3 + R4) | −0.94 |
| L1Ø (mm) | 4.4 | L2Ø (mm) | 3.5 | L3Ø (mm) | 3.15 | MIT (mm) | 11 |
| GP1T(mm) | 3 | Dm1 (mm) | 4.4 | Dm2 (mm) | 4.12 | M1T/GP1T | 3.667 |
| M1T − (L1Ø + L2Ø + L3Ø) | | −0.05 | | | | Dm1/EFL | 0.374 |
| Dm2/EFL | | 0.349 | | | | | |

In addition, the lens device 300 of the third embodiment can meet the requirements of optical performance. The field curvature of tangential direction and sagittal direction in the lens device 300 of the third embodiment ranges from −0.04 mm to 0.15 mm, the distortion in the lens device 300 of the third embodiment ranges from 0% to 0.25%, and the modulation transfer function of tangential direction and sagittal direction in the lens device 300 of the third embodiment ranges from 0.65 to 1.0. It is obvious that the field curvature and the distortion of the lens device 300 of the third embodiment can be effectively corrected, and the image resolution can meet the requirements. Therefore, the lens device 300 of the third embodiment is capable of good optical performance.

In the third embodiment, the lens device 300 has three lenses, an aperture stop disposed between the lenses, and a light path turning module 303 configured to reflect the light three times. By such arrangement, the space utilization is effectively improved and the back focal length is increased. Further, the glass lens and the plastic lens are combined to be used. By such arrangement, the optical total length (TTL) is reduced, the optical performance is promoted, and the cost of materials is reduced.

Figure 6:
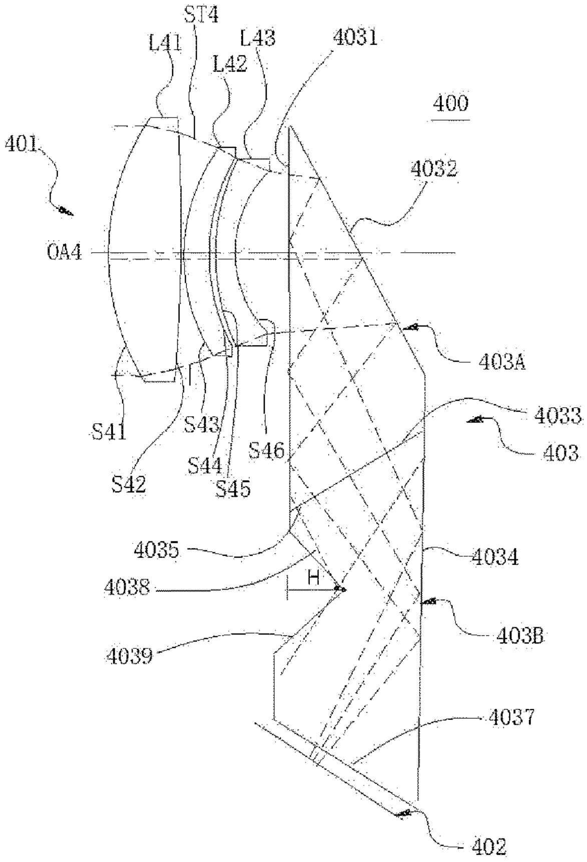
FIG. 6 is a schematic view of a lens device in accordance with a fourth embodiment of the invention.

FIG. 6 is a schematic view of a lens device 400 in accordance with a fourth embodiment of the invention. A part of the fourth embodiment is same as that of the third embodiment and therefore the descriptions thereof are omitted. As shown in FIG. 6, the lens device 400 includes a lens module 401, an image forming unit 402, and a light path turning module 403 disposed between the lens module 401 and the image forming unit 402. The lens module 401 has an optical axis OA4 extending in the first direction. The lens module 401 is movable in the first direction to perform auto focus operation and is movable in a second direction and/or a third direction to perform vibration compensation operation, wherein the second direction and the third direction are perpendicular to the first direction. In operation, light emitted from the lens module 401 reaches the light path turning module 403, experiences three reflections in the light path turning module 403, and is emitted from the light path turning module 403 to form an image on the image forming unit 402.

The lens module 401 includes a first lens L41, a second lens L42 and a third lens L43 which are arranged in order along the optical axis OA4 from an object side to an image side. The lens module 401 further includes an aperture stop ST4 disposed between the first lens L41 and the second lens L42. The first lens L41 is with positive refractive power, and has an object side surface S41 that is a convex surface and an image side surface S42 that is a concave surface. The object side surface S41 and the image side surface S42 of the first lens L41 are aspherical. The first lens L41 is made of plastic. Both surfaces SST4 of the aperture stop ST4, not labeled in FIG. 6 but shown in Table 10, are planar. The second lens L42 is with negative refractive power, and has an object side surface S43 that is a convex surface and an image side surface S44 that is a concave surface. The object side surface S43 and the image side surface S44 of the second lens L42 are aspherical. The second lens L32 is made of plastic. The third lens L43 is with positive refractive power, and has an object side surface S45 that is a convex surface and an image side surface S46 that is also a convex surface. The object side surface S45 and the image side surface S46 of the third lens L43 are aspherical. The third lens L43 is made of glass. The first lens L41, the second lens L42 and the third lens L43 are arranged in order along the optical axis OA4 from an object side to an image side.

In the fourth embodiment depicted by the figure, the light path turning module 403 includes a first light path turning element 403A and a second light path turning element 403B. The first light path turning element 403A includes a light incident surface 4031 on which the light emitted from the lens module 401 is incident at a right angle, a first light reflective surface 4032 reflecting the light back to the light incident surface 4031 after the light is incident on the light incident surface 4031, and a light emitting surface 4033 allowing the light to pass through after the light is reflected on the light incident surface 4031. After passing through the light emitting surface 4033, the light enters the second light path turning element 403B. The second light path turning element 403B includes a second light incident surface 4035 allowing the light emitted from the light emitting surface 4033 to pass through, a second light reflective surface 4034 reflecting the light that passes through the second light incident surface 4035, and a second light emitting surface 4037. The second light incident surface 4035 of the second light path turning element 403B and the light emitting surface 4033 of the first light path turning element 403A are disposed in contact with each other to form a plane. In operation, the light is incident on the light incident surface 4031, reaches and is reflected on the first light reflective surface 4032, reaches and is reflected on the light incident surface 4031, passes through the light emitting surface 4033 and the second light incident surface 4035, reaches and is reflected on the second light reflective surface 4034, and is emitted from the second light emitting surface 4037. The lens module 401 is disposed at a side of the light incident surface 4031 and distant from the image forming unit 402.

In the third embodiment depicted by the figure, the light incident surface 4031 is disposed adjacent to the first light reflective surface 4032 and the light emitting surface 4033. However, the invention is not limited thereto. For example, the light incident surface 4031 can be connected to the first light reflective surface 4032 and the light emitting surface 4033 through other surfaces. Similarly, the second light reflective surface 4034 may be disposed adjacent to the second light incident surface 4035 and the second light emitting surface 4037 or may be connected to the second light incident surface 4035 and the second light emitting surface 4037 through other surfaces. The second light emitting surface 4037 and the second light incident surface 4035 have a first connecting surface 4038 and a second connecting surface 4039 connected therebetween.

The first connecting surface 4038 and the second connecting surface 4039 are formed into a concave structure of the light path turning module 403. The junction point of the first connecting surface 4038 and the second connecting surface 4039 is slightly deeper than the intersection of the peripheral light reflected by the light incident surface 4031 and the first light incident surface 4032. The first connecting surface 4038 is configured to block a part of peripheral light reflected by the first light reflective surface 4032 and a part of peripheral light reflected by the light incident surface 4031. Since each blocked part is on two sides of the peripheral light, ghost images can be effectively reduced. It is preferred that at least one of the first connecting surface 4038 and the second connecting surface 4039 has a light absorbing film attached thereto.

Further, the first light path turning element 403A and the second light path turning element 403B may be integrally formed as a continuous-unity piece. Under such circumstance, the first connecting surface 4038 and the second connecting surface 4039 are formed on the light incident surface 4031.

It is understood that, in all embodiments of the invention, the first connecting surface and the second connecting surface can be replaced with a continuous-unity concave curved surface, which will not be repeated hereinafter. The light path turning module 403 can be implemented in other forms which will be described in detail later.

The lens module 401 is disposed at a side of the light incident surface 4031, aside from the center of the light incident surface 4031, and near an edge of the light incident surface 4031. In the fourth embodiment depicted by the figure, the lens module 401 is disposed at a side of the light incident surface 4031 and distant from the image forming unit 402. Such arrangement is advantageous to increasing the back focal length of the lens device 400.

Table 10 shows the optical specification of the lens device 400, in which the included angle between the first light reflective surface 4032 and the light incident surface 4031 is −29°, the included angle between the light emitting surface 4033 and the light incident surface 4031 is 58°, the included angle between the second light incident surface 4035 and the light incident surface 4031 is 58°, the included angle between the second light reflective surface 4034 and the light incident surface 4031 is 0°, and the included angle between the second light emitting surface 4037 and the light incident surface 4031 is −29°. The light path turning module 403 is substantially parallelogram. The light incident surface 4031 is used as a reference surface and is defined as 0°.

TABLE 10

Effective Focal Length = 14.08 mm F-number = 2.2
Optical Total Length (TTL) = 22.766 mm Field of View = 15.85 degrees

| Surface Number | Radius of Curvature (mm) | Thickness (mm) | Nd | Vd | Effective Diameter (mm) | Effective Focal Length (mm) | Remark |
|---|---|---|---|---|---|---|---|
| S41 | 6.26 | 0.86 | 2.00 | 19.32 | 6.4 | 7.83 | L41 |
| S42 | 27.92 | 0.25 | | | 6.27 | | |
| SST4 | ∞ | 0.22 | | | 6.25 | | ST4 |
| S43 | 12.61 | 0.35 | 1.67 | 19.24 | 6.09 | −5.19 | L42 |
| S44 | 2.72 | 0.64 | | | 5.36 | | |
| S45 | 7.46 | 0.85 | 1.86 | 48.54 | 5.36 | 8.20 | L43 |
| S46 | −148.43 | 0.20 | | | 5.32 | | |
| S47 | ∞ | 2.22 | 1.74 | 50.00 | 6.59 | | 403A 4031 |
| S48 | ∞ | 4.20 | | | 6.02 | | 4032 |
| S49 | ∞ | 4.1 | | | 9.74 | | 4031 |
| S410 | ∞ | 4 | 1.74 | 50.00 | 4.61 | | 403B 4035 |
| S411 | ∞ | 4.072 | | | 8.65 | | 4034 |
| S412 | | 0.3 | | | | | 4037 |
| S413 | | 0.21 | | | | | |
| S414 | | 0.28 | | | | | |

The definition of aspheric surface sag z of each aspheric lens in Table 10 is identical to that in Table 7 and therefore is not repeated. In the fourth embodiment, the conic constant k and the aspheric coefficients A, B, C, D, E, F and G of each aspheric lens are shown in Table 11.

TABLE 11

| Surface Number | k / E | A / F | B / G | C | D |
|---|---|---|---|---|---|
| S41 | −0.4080406 | −0.001629275 | 1.39E−05 | −8.76E−07 | 2.12E−07 |
| | 4.81E−09 | −1.49E−08 | 1.15E−09 | | |
| S42 | −22.06612 | −2.68E−05 | 6.31E−06 | 8.69E−06 | −1.49E−06 |
| | 1.02E−08 | 1.42E−11 | 7.05E−10 | | |
| S43 | 12.90904 | −0.003285026 | 2.77E−05 | 1.22E−05 | −1.72E−06 |
| | 1.87E−07 | 1.70E−08 | −1.34E−09 | | |

TABLE 11-continued

| Surface Number | k E | A F | B G | C | D |
|---|---|---|---|---|---|
| S44 | −0.1217201 | −0.006397926 | −0.000706861 | −5.77E−05 | 4.66E−07 |
| | 2.75E−07 | 9.10E−08 | −1.96E−08 | | |
| S45 | 5.230081 | 0.002667143 | −0.000202793 | 2.76E−07 | −6.01E−06 |
| | 3.89E−08 | 6.85E−08 | −1.55E−08 | | |
| S46 | 376.7723 | 0.001796423 | 0.000191416 | −1.93E−05 | 4.12E−06 |
| | 3.47E−07 | −2.53E−07 | 1.19E−08 | | |

Table 12 shows the parameters and condition values for conditions (1)-(6) in accordance with the fourth embodiment of the invention. It can be seen from Table 12 that the lens device 400 of the fourth embodiment satisfies the conditions (1)-(6).

TABLE 12

| | | | | | | | |
|---|---|---|---|---|---|---|---|
| f1 (mm) | 7.83 | f2(mm) | −5.19 | f3 (mm) | 8.20 | | |
| TTL (mm) | 22.766 | R1(mm) | 6.26 | R2(mm) | 27.92 | | |
| R3(mm) | 12.61 | R4(mm) | 2.72 | | | | |
| (f1 + f2 + f3)/TTL | 0.48 | (R1 + R2)/(R3 + R4) | 2.23 | | | | |
| L1Ø (mm) | 6.4 | L2Ø (mm) | 6.09 | L3Ø (mm) | 5.36 | M1T (mm) | 18.595 |
| GP1T(mm) | 3.38 | Dm1 (mm) | 6.4 | Dm2 (mm) | 6.26 | M1T/GP1T | 5.50 |
| M1T − (L1Ø + L2Ø + L3Ø) | 0.745 | Dm1/EFL | 0.455 | | | | |
| Dm2/EFL | 0.444 | | | | | | |

In addition, the lens device 400 of the third embodiment can meet the requirements of optical performance. The field curvature of tangential direction and sagittal direction in the lens device 400 of the fourth embodiment ranges from −0.04 mm to 0.15 mm, the distortion in the lens device 400 of the fourth embodiment ranges from 0% to 0.25%, and the modulation transfer function of tangential direction and sagittal direction in the lens device 400 of the fourth embodiment ranges from 0.65 to 1.0. It is obvious that the field curvature and the distortion of the lens device 400 of the fourth embodiment can be effectively corrected, and the image resolution can meet the requirements. Therefore, the lens device 400 of the fourth embodiment is capable of good optical performance.

In the fourth embodiment, the lens device 400 has three lenses, an aperture stop disposed between the lenses, and a light path turning module 403 configured to reflect the light three times. By such arrangement, the space utilization is effectively improved and the back focal length is increased. Further, the glass lens and the plastic lens are combined to be used. By such arrangement, the optical total length (TTL) is reduced, the optical performance is promoted, and the cost of materials is reduced.

Figure 7:
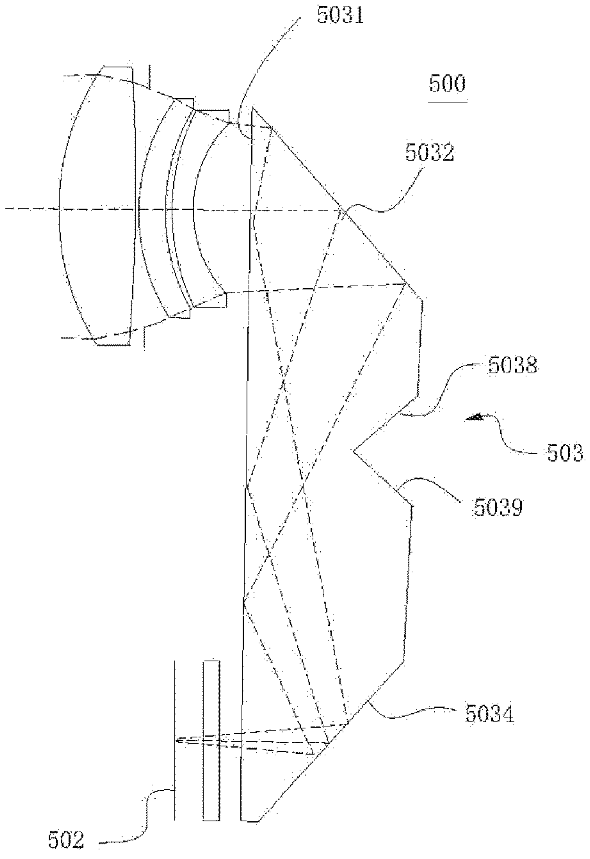
FIG. 7 is a schematic view of a lens device in accordance with a fifth embodiment of the invention.

FIG. 7 is a schematic view of a lens device 500 in accordance with a fifth embodiment of the invention. The fifth embodiment is an embodiment modified from the third embodiment and therefore the part of the fifth embodiment same as that of the third embodiment will not be repeated. In the fifth embodiment, the lens device 500 is the same as that of the third embodiment, and the light path turning module 503 is a continuous-unity piece.

In the fifth embodiment depicted by the figure, the light path turning module 503 includes a light incident surface 5031 on which the light emitted from the lens module 501 is incident at a right angle, a first light reflective surface 5032 reflecting the light back to the light incident surface 5031 after the light is incident on the light incident surface 5031, and a second light reflective surface 5034 reflecting the light reflected on the light incident surface 5031 back to the light incident surface 5031. After reflected back to the light incident surface 5031, the light is emitted from the light incident surface 5031. In conclusion, light enters the light path turning module 503 through the light incident surface 5031, reaches and is reflected on the first light reflective surface 5032, reaches and is reflected on the light incident surface 5031, reaches and is reflected on the second light reflective surface 5034, and exits from the light emitting surface 5031. The lens module 501 is disposed at a side of the light incident surface 5031 and is disposed distant from the image forming unit 502.

The light incident surface 5031 is disposed adjacent to the first light reflective surface 5032 and the second light reflective surface 5034. The first light reflective surface 5032 and the second light reflective surface 5034 may have a connecting surface connected therebetween, and the connecting surface is disposed close to the edge of the first light reflective surface 5032 where the light is reflected.

In the fifth embodiment depicted by the figure, the first light reflective surface 5032 and the second light reflective surface 5034 may have a first connecting surface 5038 and a second connecting surface 5039 directly or indirectly connected therebetween, and the first connecting surface 5038 and the second connecting surface 5039 are disposed close to the edges of the first light reflective surface 5032 and the light incident surface 5031 where the light is reflected.

The first connecting surface 5038 and the second connecting surface 5039 are formed into a concave structure of the light path turning module 503. The junction point of the first connecting surface 5038 and the second connecting surface 5039 has a depth H and is slightly deeper than the intersection of the peripheral light reflected by the light incident surface 5031 and the first light reflective surface 5032. The first connecting surface 5038 is configured to block a part of peripheral light reflected by the first light reflective surface 5032 and a part of peripheral light reflected by the light incident surface 5031. Since each blocked part is on two sides of the peripheral light, ghost images can be effectively reduced. It is preferred that at least one of the first connecting surface 5038 and the second connecting surface 5039 has a light absorbing film attached thereto. The included angle between the first light reflective surface 5032 and the light incident surface 5031 is −37°, the included angle between the second light reflective surface 5034 and the light incident surface 5031 is 37°, and the light incident surface 5031 is used as a reference surface and is defined as 0°. The light path turning module 503 can be implemented in other forms which will be described in detail later.

Figure 8:
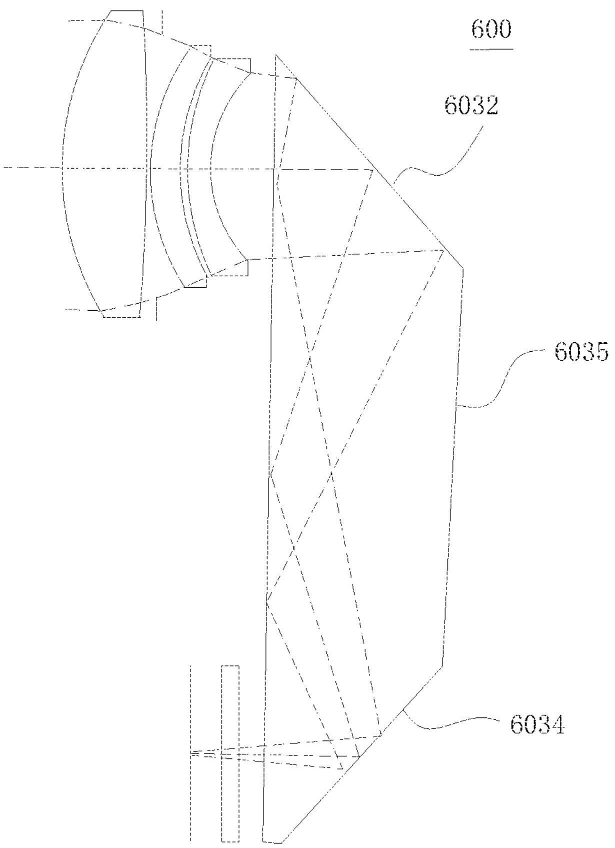
FIG. 8 is a schematic view of a lens device in accordance with a sixth embodiment of the invention.

FIG. 8 is a schematic view of a lens device 600 in accordance with a sixth embodiment of the invention. The sixth embodiment is an embodiment modified from the fourth embodiment and the fifth embodiment and therefore the part of the sixth embodiment same as those of the fourth embodiment and the fifth embodiment will not be repeated. The light path turning modules of the sixth embodiment and the fifth embodiment are almost identical. The differences are that in the sixth embodiment the first light reflective surface 6032 and the second light reflective surface 6034 have a connecting surface 6035 connected therebetween, the connecting surface 6035 is disposed near the edge of the first light reflecting surface 6032 where the light is reflected, and the connecting surface 6035 is provided with no concave structure.

Figure 9A:
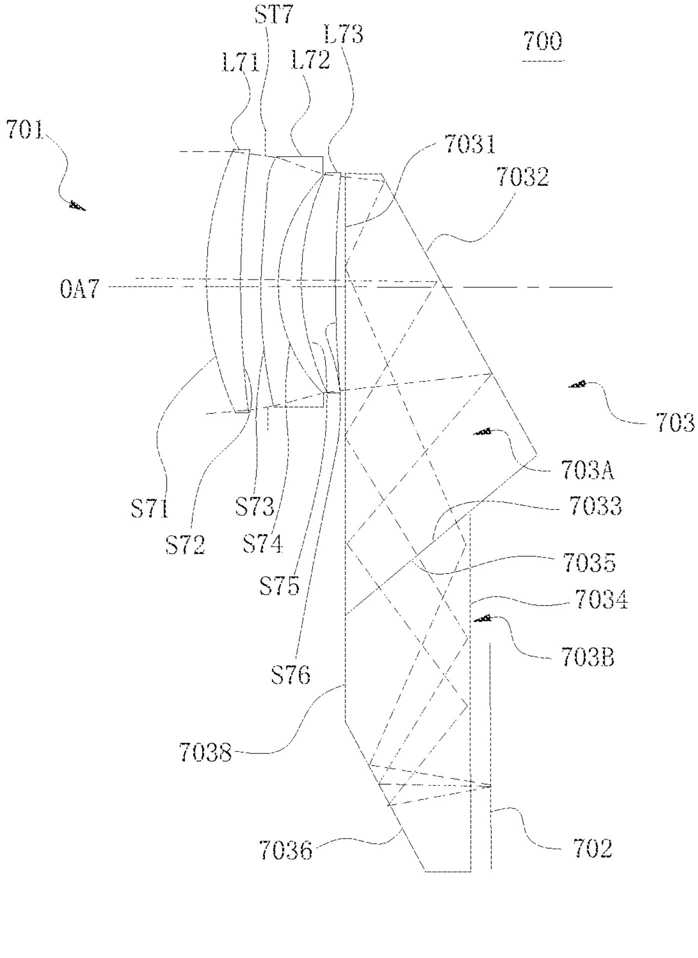
FIG. 9A is a schematic view of a lens device in accordance with a seventh embodiment of the invention.

FIG. 9A is a schematic view of a lens device 700 in accordance with a seventh embodiment of the invention. The part of the seventh embodiment same as the above embodiments is not repeated. As shown in FIG. 9A, the lens device 700 includes a lens module 701, an image forming unit 702, and a light path turning module 703 disposed between the lens module 701 and the image forming unit 702. The lens module 701 has an optical axis OA7 extending in a first direction. The lens module 701 is movable in the first direction to perform auto focus operation and is movable in a second direction and/or a third direction to perform vibration compensation operation, wherein the second direction and the third direction are perpendicular to the first direction. In operation, light emitted from the lens module 701 reaches the light path turning module 703, experiences three reflections in the light path turning module 703, and is emitted from the light path turning module 703 to form an image on the image forming unit 702.

The lens module 701 includes a first lens L71, a second lens L72 and a third lens L73 which are arranged in order along the optical axis OA7 from an object side to an image side. The lens module 701 further includes an aperture stop ST7 disposed between the first lens L71 and the second lens L72. The first lens L71 is with positive refractive power, and has an object side surface S71 that is a convex surface and an image side surface S72 that is a concave surface. The object side surface S71 and the image side surface S72 of the first lens L71 are aspherical. The first lens L71 is made of glass. Both surfaces SST7 of the aperture stop ST7, not labeled in FIG. 9A but shown in Table 13, are planar. The second lens L72 is with negative refractive power, and has an object side surface S73 that is a convex surface and an image side surface S74 that is a concave surface. The object side surface S73 and the image side surface S74 of the second lens L72 are aspherical. The second lens L72 is made of plastic. The third lens L73 is with positive refractive power, and has an object side surface S75 that is a convex surface and an image side surface S76 that is also a convex surface. The object side surface S75 and the image side surface S76 of the third lens L73 are aspherical. The third lens L73 is made of glass.

In the seventh embodiment depicted by the figure, the light path turning module 703 includes a first light path turning element 703A and a second light path turning element 703B. The first light path turning element 703A includes a light incident surface 7031 on which the light emitted from the lens module 701 is incident at a right angle, a first light reflective surface 7032 reflecting the light back to the light incident surface 7031 after the light is incident on the light incident surface 7031, and a light emitting surface 7033 allowing the light to pass through after the light reflected back to the light incident surface 7031 is reflected on the light incident surface 7031. After passing through the light emitting surface 7033, the light enters the second light path turning element 703B. The second light path turning element 703B includes a second light incident surface 7035 allowing the light emitted from the light emitting surface 7033 to pass through, a second light reflective surface 7034 reflecting the light that is incident on the second light incident surface 7035, and a third light reflective surface 7036 reflecting the light reflected on the second light reflective surface 7034 back to the second light reflective surface 7034. After reflected back to the second light reflective surface 7034, the light is emitted from the second light reflective surface 7034 at a right angle. The second light incident surface 7035 of the second light path turning element 703B and the light emitting surface 7033 of the first light path turning element 703A are disposed in contact with each other to form a plane. In operation, the light is incident on the light incident surface 7031, reaches and is reflected on the first light reflective surface 7032, reaches and is reflected on the light incident surface 7031, passes through the light emitting surface 7033 and the second light incident surface 7035, reaches and is reflected on the second light reflective surface 7034, is reflected on the third light reflective surface 7036, and is emitted from the second light reflective surface 7034 at a right angle. The lens module 701 is disposed at a side of the light incident surface 7031, aside from the center of the light incident surface 7031, and near an edge of the light incident surface.

Any two of the light incident surface 7031, the first light reflective surface 7032 and the light emitting surface 7033 are disposed adjacent to each other. However, the invention is not limited thereto. The light incident surface 7031, the first light reflective surface 7032 and the light emitting surface 7033 may be connected by other surfaces interposed therebetween. Similarly, any two of the second light reflective surface 7034, the second light incident surface 7035 and the third light reflective surface 7036 may be disposed adjacent to each other. However, the invention is not limited thereto. The second light reflective surface 7034, the second light incident surface 7035 and the third light reflective surface 7036 may be connected by other surfaces interposed therebetween. As shown in the figure, the second light incident surface 7035 and the third light reflective surface 7036 of the second light path turning element 703B have a second connecting surface 7038 connected therebetween. The first light path turning element 703A and the second light path turning element 703B may be integrally formed into a continuous-unity piece. The light path turning module 703 can be implemented in other forms which will be described in detail later.

Figure 9B:
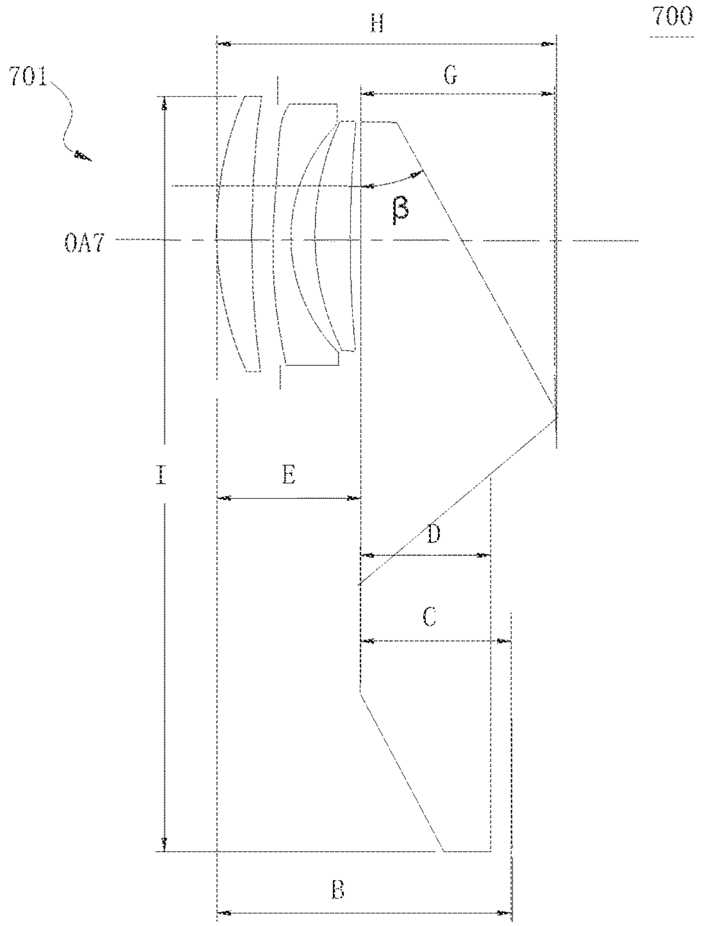
FIG. 9B is another schematic view of a lens device in accordance with the seventh embodiment of the invention, showing the parameters thereof.

In the seventh embodiment depicted by the figure, the lens module 701 is disposed at a side of the light incident surface 7031 and distant from the image forming unit 702. Such arrangement is advantageous to increasing the back focal length of the lens device 700. The first lens L71, the second lens L72 and the third lens L73 are arranged in order along the optical axis OA7 from the object side to the image side. The lens device 700 satisfies the above-mentioned conditions (1)-(6) and at least one following condition:

$$0.25 < B/I < 0.65, \quad (7)$$

$$0.4 < C/B < 0.8, \quad (8)$$

$$0.1 < G/I < 0.4, \quad (9)$$

$$0.3 < D/B < 0.6, \quad (10)$$

$$0.2 < E/H < 0.65, \quad (11)$$

$$0.5 < 1/\tan\beta < 2.5, \quad (12)$$

wherein EFL is an effective focal length of the lens device 700; B is a distance along the optical axis from the object side surface of the first lens to an image forming plane, namely the linear distance measured in a direction parallel to the optical axis; I is a distance between an edge of the lens L71 (the lens L71 has the largest outer diameter between all the lenses) distant from the image forming unit 702 and an edge of the light path turning module 703 close to the image forming unit 702, measured in a direction perpendicular to the optical axis OA7; C is a distance between the light incident surface 7031 of the light path turning module 703 and the image forming plane, measured in a direction parallel to the optical axis; G is a height of the first light reflective surface measured in a direction parallel to the optical axis, namely the maximum distance between the light incident surface of the light path turning module and the first light reflective surface; D is a distance between the light incident surface 7031 of the light path turning module and the second light reflective surface 7035 measured in a direction parallel to the optical axis, E is a distance between the object side surface S11 of the first lens L71 and the light incident surface 7031 of the light path turning module measured in the direction parallel to the optical axis; H is the maximum distance between the object side surface S11 of the first lens L71 of the lens module 701 and the first light reflective surface 7032 of the light path turning module measured in the direction parallel to the optical axis; and β is an included angle between the light incident surface 7031 and the first light reflective surface. all the parameters are labeled in FIG. 9B. The preferred embodiment of the present invention can be achieved when the lens assembly satisfies at least one of the conditions (1)-(12). The suboptimal embodiment of the present invention can be achieved when the lens assembly satisfies the conditions (3)-(8), and (11), which still have the above-mentioned advantages, namely the lens device is capable of good optical performance, the optical total length (TTL) is reduced, the optical performance is promoted, and the cost of materials is reduced.

Table 13 shows the optical specification of the lens device 700, in which the included angle between the first light reflective surface 7032 and the light incident surface 7031 is −29°, the included angle between the light emitting surface 7033 (or the second light incident surface 7035) and the light incident surface 7031 is 33°, the included angle between the second light reflective surface 7034 and the light incident surface 7031 is 0°, the included angle between the third light reflective surface 7036 and the light incident surface 7031 is −29°, and the light incident surface 7031 is used as a reference surface and is defined as 0°.

TABLE 13

Effective Focal Length = 14.08 mm F-number = 2.2
Optical Total Length (TTL) = 22.76 mm Field of View = 26.1 degrees

| Surface Number | Radius of Curvature (mm) | Thickness (mm) | Nd | Vd | Effective Diameter (mm) | Remark |
|---|---|---|---|---|---|---|
| S71 | 6.26 | 0.86 | 2.00 | 19.3 | 6.4 | L71 |
| S72 | 27.9 | 0.25 | | | 6.30 | |
| SST7 | ∞ | 0.22 | | | 6.28 | ST7 |
| S73 | 12.6 | 0.34 | 1.67 | 19.2 | 6.09 | L72 |
| S74 | 2.71 | 0.64 | | | 5.36 | |
| S75 | 7.46 | 0.85 | 1.86 | 48.5 | 5.36 | L73 |
| S76 | −148.43 | 0.1 | | | 5.32 | |
| S77 | ∞ | 2.4 | 1.74 | 50.01 | 5.32 | 703A 7031 |
| S78 | ∞ | 4.53 | | | 6.02 | 7032 |
| S79 | ∞ | 3 | | | 9.70 | 7031 |
| S710 | ∞ | 0 | | | 5.22 | 7033 |
| S711 | ∞ | 1.8 | 1.74 | 50.01 | 5.22 | 703B 7035 |
| S712 | ∞ | 4.9 | | | 10.87 | 7034 |
| S713 | ∞ | 2.6 | | | 6.44 | 7036 |
| S714 | ∞ | 0.1 | | | 5.56 | 7034 |
| S715 | ∞ | 0.21 | | | 5.55 | |
| S716 | ∞ | 0.248 | | | 5.53 | |

The definition of aspheric surface sag z of each aspheric lens in Table 13 is the same as that in Table 1, and therefore the descriptions thereof are omitted. In the seventh embodiment, the conic constant k and the aspheric coefficients A, B, C, D, E, F, G, H and I of each aspheric lens are shown in Table 14.

TABLE 14

| Surface Number | k<br>E | A<br>F | B<br>G | C<br>H | D<br>I |
|---|---|---|---|---|---|
| | −0.4080406<br>4.81E−09 | −0.001629275<br>−1.49E−08 | 1.39E−05<br>1.15E−09 | −8.76E−07<br>0 | 2.12E−07<br>0 |

TABLE 14-continued

| Surface Number | k<br>E | A<br>F | B<br>G | C<br>H | D<br>I |
|---|---|---|---|---|---|
| S72 | −22.06612 | −2.68E−05 | 6.31E−06 | 8.69E−06 | −1.49E−06 |
| | 1.02E−08 | 1.42E−11 | 7.05E−10 | 0 | 0 |
| S73 | 12.90904 | −0.003285026 | 2.77E−05 | 1.22E−05 | −1.72E−06 |
| | 1.87E−07 | 1.70E−08 | −1.34E−09 | 0 | 0 |
| S74 | −0.1217201 | −0.006397926 | −0.000706861 | −5.77E−05 | 4.66E−07 |
| | 2.75E−07 | 9.10E−08 | −1.96E−08 | 0 | 0 |
| S75 | 5.230081 | 0.002667143 | −0.000202793 | 2.76E−07 | −6.01E−06 |
| | 3.89E−08 | 6.85E−08 | −1.55E−08 | 0 | 0 |
| S76 | 376.7723 | 0.001796423 | 1.91E−04 | −1.93E−05 | 4.12E−06 |
| | 3.47E−07 | −2.53E−07 | 1.19E−08 | 0 | 0 |

Table 15 shows the parameters and condition values for conditions (1)-(12) in accordance with the seventh embodiment of the invention. It can be seen from Table 15 that the lens device 700 of the seventh embodiment satisfies the conditions (1)-(12).

TABLE 15

| | | | | | |
|---|---|---|---|---|---|
| Dm1(mm) | 6.4 | B(degrees) | 29 | Dm2(mm) | 6.26 |
| B(mm) | 6.94 | I(mm) | 17.63 | C(mm) | 3.66 |
| G(mm) | 3.94 | D(mm) | 3.1 | E (mm) | 3.28 |
| H(mm) | 7.21 | 1/tanβ | 1.80 | Dm1/EFL | 0.45 |
| Dm2/EFL | 0.44 | B/I | 0.39 | C/B | 0.53 |
| G/I | 0.22 | D/B | 0.45 | E/H | 0.45 |
| f1(mm) | 7.9 | f2(mm) | −5.23 | f3 (mm) | 8.23 |
| M1T (mm) | 19.23 | GP1T(mm) | 3.28 | L1Ø (mm) | 6.4 |
| L2Ø (mm) | 6.09 | L3Ø (mm) | 5.36 | Dm1 (mm) | 6.4 |
| Dm2 (mm) | 6.3 | M1T − (L1Ø + L2Ø + L3Ø) | 1.38 | M1T/GP1T | 5.862 |
| (f1 + f2 + f3)/TTL | 0.47 | (R1 + R2)/(R3 + R4) | 2.23 | Dm1/EFL | 0.454 |
| Dm2/EFL | 0.447 | | | | |

In addition, the lens device 700 of the seventh embodiment can meet the requirements of optical performance. The field curvature of tangential direction and sagittal direction in the lens device 700 of the seventh embodiment ranges from −0.1 mm to 0.15 mm. The distortion in the lens device 700 of the seventh embodiment ranges from −0.2% to 0%. The modulation transfer function of tangential direction and sagittal direction in the lens device 700 of the seventh embodiment ranges from 0.25 to 1.0. It is obvious that the field curvature and the distortion of the lens device 700 of the seventh embodiment can be effectively corrected, and the image resolution can meet the requirements. Therefore, the lens device 700 of the seventh embodiment is capable of good optical performance.

In the seventh embodiment, the lens device 700 has three lenses, an aperture stop disposed between the lenses, and a light path turning module 703 configured to reflect the light four times. By such arrangement, the space utilization is effectively improved and the back focal length is increased. Further, the glass lens and the plastic lens are combined to be used. By such arrangement, the optical total length (TTL) is reduced, the optical performance is promoted, and the cost of materials is reduced.

Figure 10:
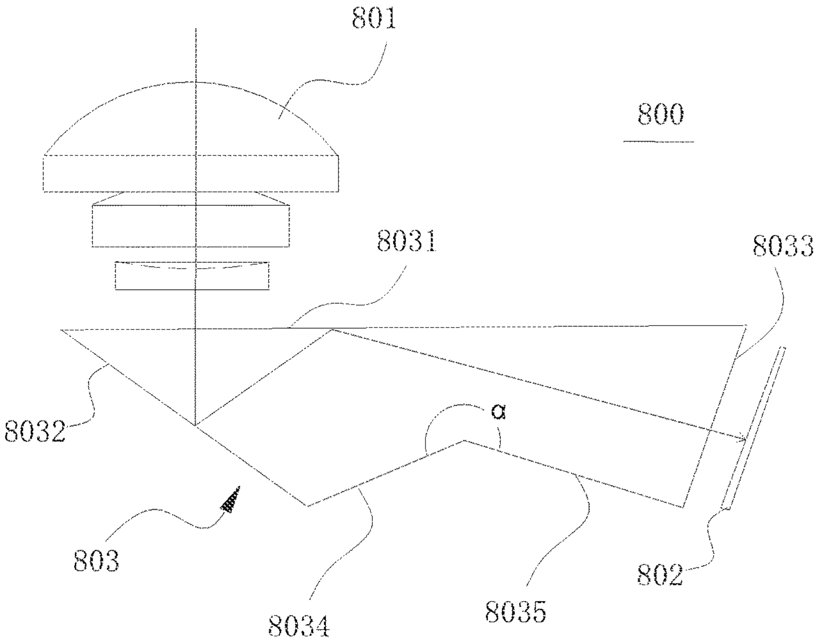
FIG. 10 is a schematic view of a lens device in accordance with an eighth embodiment of the invention.

FIG. 10 is a schematic view of a lens device 800 in accordance with an eighth embodiment of the invention. The lens device 800 includes a lens module 801, an image forming unit 802, and a light path turning module 803 disposed between the lens module 801 and the image forming unit 802. The lens module 801 has an optical axis OA8 extending in the first direction, and has one or more lenses. The one or more lenses are stationary on the optical axis OA8. Alternatively, at least one of the lenses is movable along the optical axis OA8 to change the distance between the lenses for performing zoom operation. The lens module 801 is movable in the first direction to perform auto focus operation and is movable in a second direction and/or a third direction to perform vibration compensation operation, wherein the second direction and the third direction are perpendicular to the first direction.

The light path turning module 803 includes a light incident surface 8031 on which the light emitted from the lens module 801 is incident at a right angle, a first light reflective surface 8032 reflecting the light incident on the light incident surface 8031 at a right angle back to the light incident surface 8031 on which the light is further reflected, and a light emitting surface 8033 allowing the light to pass through after the light is reflected on the light incident surface 8031. After passing through the light emitting surface 8033, the light enters the image forming unit 802. The light emitting surface 8033 is disposed towards the image forming unit 802 so that the light emitted from the light emitting surface 8033 can reach the image forming unit 802. The light incident surface 8031 is connected between the first light reflective surface 8032 and the light emitting surface 8033.

The lens module 801 is disposed above the light incident surface 8031 and near an edge of the light incident surface 8031. Therefore, the lens module 801 is aside from the center of the light incident surface 8031. In the eighth embodiment depicted by the figure, the lens module 801 is disposed above the light incident surface 8031, and is disposed at a side of light path turning module 803 that is distant from the image forming unit 802. Such arrangement is advantageous to increasing the back focal length of the lens device 800.

The first light reflective surface 8032 and the light emitting surface 8033 may have one or more connecting surfaces connected therebetween. The connection of the connecting surfaces to the first light reflective surface 8032 and the light emitting surface 8033 is close to the edges of the first light reflective surface 8032 and the light emitting surface 8033 where the light is reflected. Such arrangement is advantageous to reduction of the thickness of the light path turning module 803 (i.e. the dimension measured in the direction parallel to the optical axis in FIG. 10). The connecting surfaces may be planar or formed into a concave structure.

Further, the connecting surfaces are configured to block a part of peripheral light that is reflected in the light path turning device. Therefore, it is preferred that the connecting surfaces are arranged into a concave structure. The concave structure is slightly deeper than the intersection of the peripheral light reflected by the two light reflective surfaces. The depth of the concave structure is determined in accordance with the extent of the ghost images of the lens device

800. The concave structure is required to have a sufficient depth for totally blocking the peripheral light that causes the ghost images.

In the eighth embodiment depicted by the figure, the first light reflective surface 8032 and the light emitting surface 8033 have a first connecting surface 8034 and a second connecting surface 8035 connected therebetween. The first connecting surface 8034 and the second connecting surface 8035 have an included angle α therebetween, wherein the included angle α is defined in the light path turning module 803 and is directed to the light incident surface 8031. It is preferred that $180° \leq \alpha < 270°$. However, the included angle α is not limited thereto. The included angle α may be greater than or equal to 270°.

The first connecting surface 8034 and the second connecting surface 8035 are formed into a concave structure of the light path turning module 803. The junction point of the first connecting surface 8034 and the second connecting surface 8035 has a depth H and is slightly deeper than the intersection of the peripheral light reflected by the light incident surface 8031 and the first light reflective surface 8032 (as referred to the third embodiment). The first connecting surface 8034 is configured to block a part of peripheral light reflected by the first light reflective surface 8032 and a part of peripheral light reflected by the light incident surface 8031. Since each blocked part is on two sides of the peripheral light, ghost images can be effectively reduced.

It is preferred that at least one of the first connecting surface 8034 and the second connecting surface 8035 has a light absorbing film attached thereto. The light absorbing film may be made of black light-proof material that is coated on at least one of the first connecting surface 8034 and the second connecting surface 8035, or may be a light-proof sheet attached to the first connecting surface 8034 and the second connecting surface 8035 through adhesive.

It is understood that the first connecting surface 8034 may be indirectly connected to the first light reflective surface 8032, and the second connecting surface 8035 may be indirectly connected to the light emitting surface 8033. For example, the first connecting surface 8034 and the first light reflective surface 8032 may have a third connecting surface connected therebetween, and the second connecting surface 8035 and the light emitting surface 8033 may have a fourth connecting surface connected therebetween.

In the eighth embodiment, the light path turning module 803 is used for reflecting the light twice, and the lens module 801 is disposed aside from the center of the light incident surface 8031. Such arrangement is advantageous to increasing the back focal length of the lens device 800. Further, the shape of the light path turning module 803 is advantageous to reduction of the thickness thereof.

Figure 11:
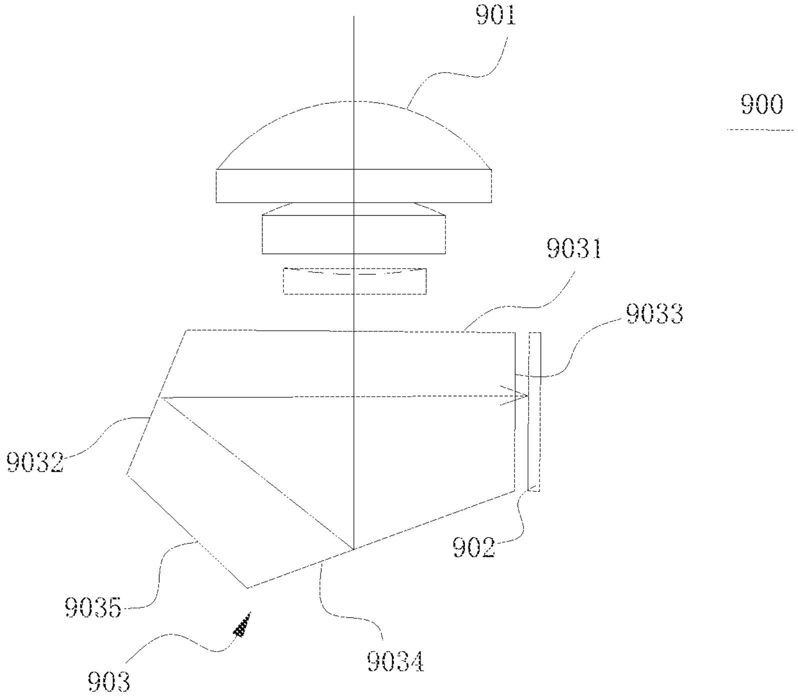
FIG. 11 is a schematic view of a lens device in accordance with a ninth embodiment of the invention.

FIG. 11 is a schematic view of a lens device 900 in accordance with a ninth embodiment of the invention. A part of the ninth embodiment is same as that of the eighth embodiment and therefore the descriptions thereof are omitted. As shown in FIG. 11, the lens device 900 includes a lens module 901, an image forming unit 902, and a light path turning module 903 disposed between the lens module 901 and the image forming unit 902. The light path turning module 903 includes a light incident surface 9031 on which the light emitted from the lens module 901 is incident at a right angle, a first light reflective surface 9034 reflecting the light incident on the light incident surface 9031, a second light reflective surface 9032 reflecting the light which comes from the first light reflective surface 9034, and a light emitting surface 9033 allowing the light to pass through after the light is reflected on the second light reflective surface 9032. After passing through the light emitting surface 9033, the light enters the image forming unit 902. The light emitting surface 9033 is disposed towards the image forming unit 902. The light incident surface 9031 is connected between the second light reflective surface 9032 and the light emitting surface 9033. The lens module 901 is disposed above the light incident surface 9031 and is aside from the center of the light incident surface 9031.

The light incident surface 9031 is disposed adjacent to the second light reflective surface 9032 and the light emitting surface 9033. The light emitting surface 9033 is disposed adjacent to the first light reflective surface 9034. However, the invention is not limited thereto. They may have connecting surfaces connected therebetween. The first light reflective surface 9034 and the second light reflective surface 9032 may have one or more connecting surfaces 9035 connected therebetween. The connection of the connecting surface 9035 to the first light reflective surface 9034 and the second light reflective surface 9032 is close to the edges of the first light reflective surface 9034 and the second light reflective surface 9032 where the light is reflected. Such arrangement is advantageous to reduction of the thickness of the light path turning module 903. The connecting surface 9035 may be planar or formed into a concave structure.

In the ninth embodiment depicted by the figure, the connecting surface 9035 is planar. When the connecting surface 9035 is a concave surface, it is required that the connecting surface 9035 has a sufficient depth for blocking the peripheral light reflected by the first light reflective surface 9034, and a light absorbing film is attached to the connecting surface 9035. In the ninth embodiment, the lens module 901 may be disposed above the light incident surface 9031, disposed at a side of the light path turning module 903 near the image forming unit 902, or disposed at the center of the light incident surface 9031.

Figure 12:
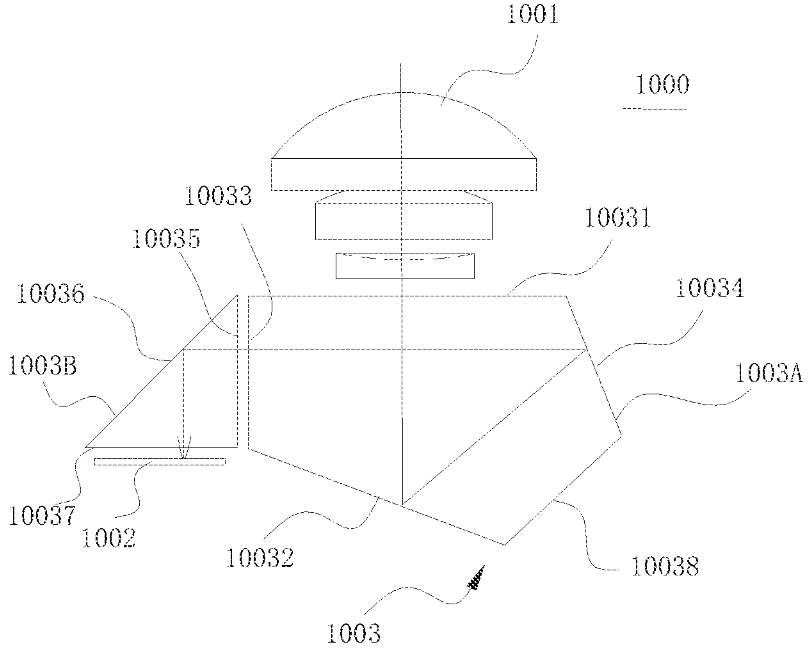
FIG. 12 is a schematic view of a lens device in accordance with a tenth embodiment of the invention.

FIG. 12 is a schematic view of a lens device 1000 in accordance with a tenth embodiment of the invention. A part of the tenth embodiment is same as those of the eighth embodiment and the ninth embodiment and therefore the descriptions thereof are omitted. The tenth embodiment is modified from the ninth embodiment. As shown in FIG. 12, the lens device 1000 includes a lens module 1001, an image forming unit 1002, and a light path turning module 1003 disposed between the lens module 1001 and the image forming unit 1002.

In the tenth embodiment, the light path turning module 1003 includes a first light path turning element 1003A and a second light path turning element 1003B. The first light path turning element 1003A includes a light incident surface 10031 on which the light emitted from the lens module 1001 is incident at a right angle, a first light reflective surface 10032 reflecting the light incident on the light incident surface 10031, a second light reflective surface 10034 reflecting the light which comes from the first light reflective surface 10032, and a light emitting surface 10033 allowing the light to pass through after the light is reflected on the second light reflective surface 10034. After passing through the light emitting surface 10033, the light enters the second light path turning element 1003B. The second light path turning element 1003B includes a second light incident surface 10035 allowing the light emitted from the light emitting surface 1003 to pass through, a third light reflective surface 10036 reflecting the light which passes through the second light incident surface 10035, and a second light emitting surface 10037. The second light incident surface 10035 of the second light path turning element 1003B is disposed towards the light emitting surface 10033. The second light incident surface 10035 and the light emitting surface 10033 are disposed in parallel to each other and have an air gap therebetween. Alternatively, the second light incident surface 10035 and the light emitting surface 10033 are attached to each other without any air gap therebetween. In operation, the light is emitted from the light emitting surface 10033, passes through the second light incident surface 10035, enters the second light path turning element 1003B, is reflected on the third light reflective surface 10036, and is emitted from the second light emitting surface 10037.

The light incident surface 10031 is disposed adjacent to the second light reflective surface 10034 and the light emitting surface 10033. The light emitting surface 10033 is disposed adjacent to the first light reflective surface 10032. However, the invention is not limited thereto. They may have connecting surfaces connected therebetween. The first light reflective surface 10032 and the second light reflective surface 10034 may have one or more connecting surfaces 10038 connected therebetween. The connection of the connecting surface 10038 to the first light reflective surface 10032 and the second light reflective surface 10034 is close to the edges of the first light reflective surface 10032 and the second light reflective surface 10034 where the light is reflected. The connecting surface 10038 may be planar or formed into a concave structure.

In the tenth embodiment depicted by the figure, the connecting surface 10038 is planar. When the connecting surface 10038 is a concave surface, it is required that the connecting surface 10038 has a sufficient depth for blocking the peripheral light reflected by the first light reflective surface 10032, and a light absorbing film is attached to the connecting surface 10038. The lens module 1001 may be disposed above the light incident surface 10031, disposed at a side of the light path turning module 1003 near the image forming unit 1002, or disposed at the center of the light incident surface 10031. In the tenth embodiment, the light experiences three reflections and is emitted. Therefore, the lens device 1000 has an increased back focal length.

Figure 13A:
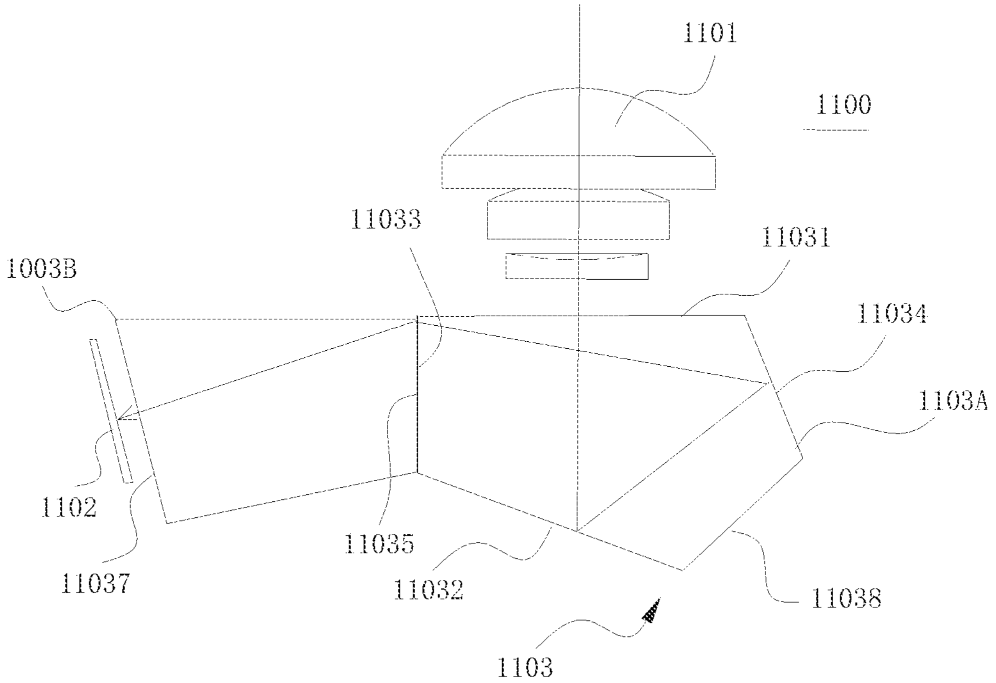
FIG. 13A is a schematic view of a lens device in accordance with an eleventh embodiment of the invention.

FIG. 13A is a schematic view of a lens device 1100 in accordance with an eleventh embodiment of the invention. The eleventh embodiment is modified from the ninth embodiment. A part of the eleventh embodiment is same as those of the above embodiments and therefore the descriptions thereof are omitted. As shown in FIG. 13, the lens device 1100 includes a lens module 1101, an image forming unit 1102, and a light path turning module 1103 disposed between the lens module 1101 and the image forming unit 1102.

In the eleventh embodiment, the light path turning module 1103 includes a first light path turning element 1103A and a second light path turning element 1103B. The first light path turning element 1103A includes a light incident surface 11031 on which the light emitted from the lens module 1101 is incident at a right angle, a first light reflective surface 11032 reflecting the light incident on the light incident surface 11031, a second light reflective surface 11034 reflecting the light which comes from the first light reflective surface 11032, and a first light emitting surface 11033 allowing the light to pass through after the light is reflected on the second light reflective surface 11034. After passing through the first light emitting surface 11033, the light enters the second light path turning element 1103B. The second light path turning element 1103B includes a second light incident surface 11035 and a second light emitting surface 11037. The second light incident surface 11035 and the first light emitting surface 11033 are disposed in contact with each other to form a plane. The light is refracted on the plane, enters the second light path turning element 1103B, is emitted from the second light emitting surface 11037, and enters the image forming unit 1102.

Figure 13B:
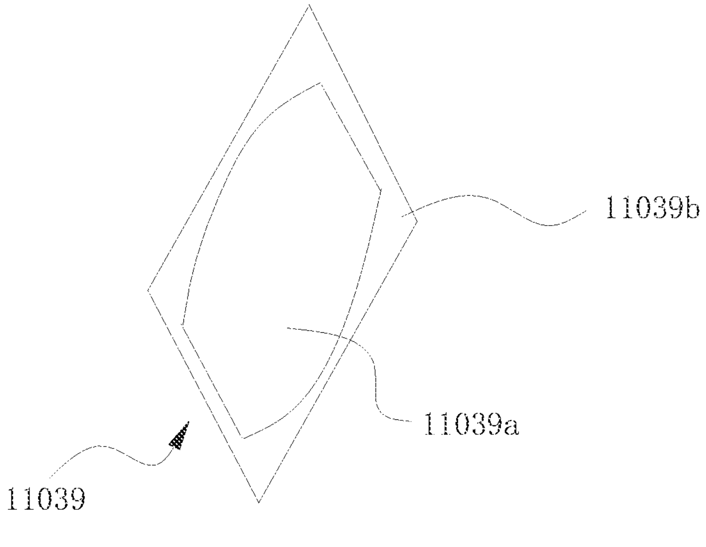
FIG. 13B is a schematic view of an aperture stop of the lens device in accordance with the eleventh embodiment of the invention.

A light absorbing stop 11039, as shown in FIG. 13B, is attached to the first light emitting surface 11033 or the second light incident surface 11035 for blocking a part of peripheral light and therefore reducing the ghost images. The light absorbing stop 11039 is identical to the first light emitting surface 11033 in shape and size. Alternatively, the light absorbing stop 11039 and the first light emitting surface 11033 are "similar" in shape while the light absorbing stop 11039 is slightly smaller than the first light emitting surface 11033, where "similar" is geometric similar in mathematics. The light absorbing stop 11039 is black and has a hole **11039*a* allowing the light to pass through. A light absorbing portion 11039*b* is configured to surround the hole 11039*a*. The hole 11039*a* may be similar to the lenses of the lens module 201 in shape. However, the invention is not limited thereto. The shape of the hole 11039*a* may be modified, depending on the state of reduction of the ghost images. The light absorbing stop 11039 may be made of black light-proof material that is coated on the first light emitting surface 11033 or the second light incident surface 11035, or may be a light-proof sheet attached to the first light emitting surface 11033 or the second light incident surface 11035** through adhesive.

The first light reflective surface 11032 and the second light reflective surface 11034 may have one or more connecting surfaces 11038 connected therebetween. The connection of the connecting surfaces 11038 to the first light reflective surface 11032 and the second light reflective surface 11034 is close to the edges of the first light reflective surface 11032 and the second light reflective surface 11034 where the light is reflected. The connecting surfaces 11038 may be planar or formed into a concave structure. In the eleventh embodiment depicted by the figure, the connecting surface 11038 is planar. When the connecting surface 11038 is a concave surface, it is required that the connecting surface 11038 has a sufficient depth for blocking the peripheral light reflected by the first light reflective surface 11032, and a light absorbing film is attached to the connecting surface 11038.

The lens module 1101 may be disposed above the light incident surface 11031, disposed at a side of the light path turning module 1103 near the image forming unit 1102, or disposed at the center of the light incident surface 11031. In the eleventh embodiment, the light experiences two reflections and one refraction and is emitted. Therefore, the lens device 1100 can have an increased back focal length.

Figure 14:
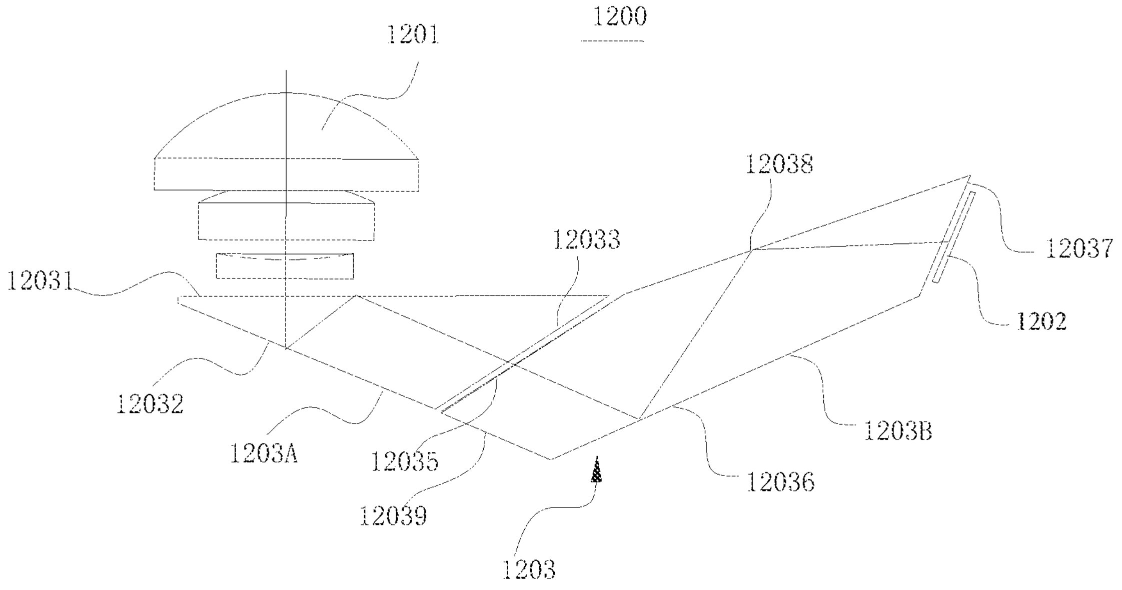
FIG. 14 is a schematic view of a lens device in accordance with a twelfth embodiment of the invention.

FIG. 14 is a schematic view of a lens device 1200 in accordance with a twelfth embodiment of the invention. A part of the twelfth embodiment is same as or similar to those of the above embodiments and therefore the descriptions thereof are omitted. As shown in FIG. 14, the lens device 1200 includes a lens module 1201, an image forming unit 1202, and a light path turning module 1203 disposed between the lens module 1201 and the image forming unit 1202.

In the twelfth embodiment, the light path turning module 1203 includes a first light path turning element 1203A and a second light path turning element 1203B. The first light path turning element 1203A includes a light incident surface 12031 on which the light emitted from the lens module 1201 is incident at a right angle, a first light reflective surface 12032 reflecting the light back to the light incident surface 12031 after the light is incident on the light incident surface 12031 at a right angle, and a light emitting surface 12033 allowing the light to pass through after the light is reflected on the light incident surface 12031. After passing through the light emitting surface 12033, the light enters the second light path turning element 1203B. The second light path turning element 1203B includes a second light incident surface 12035 allowing the light emitting from the light emitting surface 12033 to pass through, a second light reflective surface 12036 reflecting the light incident on the second light incident surface 12035, a third light reflective surface 12038 reflecting the light which comes from the second light reflective surface 12036, and a second light emitting surface 12037.

The second light incident surface 12035 of the second light path turning element 1203B is disposed towards the light emitting surface 12033. The second light incident surface 12035 and the light emitting surface 12033 are disposed in parallel to each other and have an air gap therebetween. Alternatively, the first light path turning element 1203A and the second light path turning element 1203B are attached to each other without any air gap therebetween. In operation, the light is emitted from the light emitting surface 12033, passes through the second light incident surface 12035, enters the second light path turning element 1203B, is reflected on the second light reflective surface 12036 and the third light reflective surface 12038, and is emitted from the second light emitting surface 12037.

The light incident surface 12031 is disposed adjacent to the first light reflective surface 12032 and the light emitting surface 12033. However, the invention is not limited thereto. They may have connecting surfaces connected therebetween. The second light reflective surface 12036 is disposed adjacent to the second light incident surface 12035 and the second light emitting surface 12037. The second light emitting surface 12037 is disposed adjacent to the third light reflective surface 12038. The second light incident surface 12035 and the third light reflective surface 12036 may have one or more connecting surfaces 12039 connected therebetween. The connection of the connecting surface 12039 to the second light incident surface 12035 and the third light reflective surface 12036 is close to the edge of the second light incident surface 12035 where the light is incident and the edge of the third light reflective surface 12036 where the light is reflected.

The connecting surface 12039 may be planar or formed into a concave structure. In the twelfth embodiment depicted by the figure, the connecting surface 12039 is planar. When the connecting surface 12039 is a concave surface, it is required that the connecting surface 12039 has a sufficient depth for blocking the peripheral light incident on the second light incident surface 12035, and a light absorbing film is attached to the connecting surface 12039. The lens module 1201 may be disposed above the light incident surface 12031 and distant from the image forming unit 1202.

Figure 15:
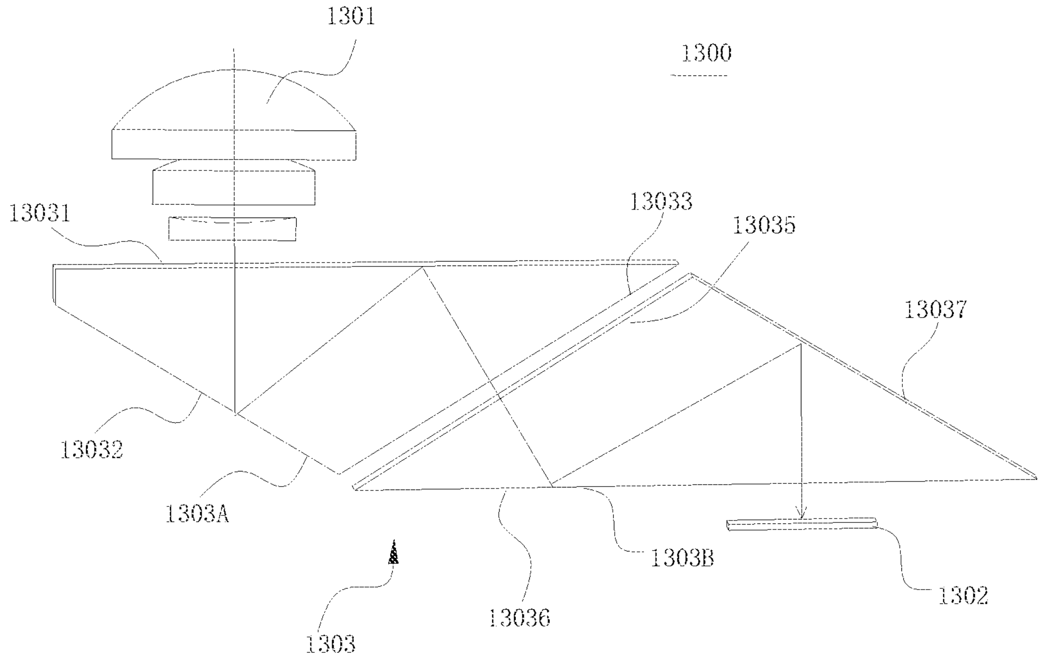
FIG. 15 is a schematic view of a lens device in accordance with a thirteenth embodiment of the invention.

FIG. 15 is a schematic view of a lens device 1300 in accordance with a thirteenth embodiment of the invention. A part of the thirteenth embodiment is same as or similar to those of the above embodiments and therefore the descriptions thereof are omitted. As shown in FIG. 15, the lens device 1300 includes a lens module 1301, an image forming unit 1302, and a light path turning module 1303 disposed between the lens module 1301 and the image forming unit 1302.

In the thirteenth embodiment, the light path turning module 1303 includes a first light path turning element 1303A and a second light path turning element 1303B. The first light path turning element 1303A includes a light incident surface 13031 on which the light emitted from the lens module 1301 is incident at a right angle, a first light reflective surface 13032 reflecting the light back to the light incident surface 13031 after the light is incident on the light incident surface 13031 at a right angle, and a light emitting surface 13033 allowing the light to pass through after the light reflected back to the light incident surface 13031 is reflected on the light incident surface 13031. After passing through the light emitting surface 13033, the light enters the second light path turning element 1303B. The second light path turning element 1303B includes a second light incident surface 13035 allowing the light emitting from the light emitting surface 13033 to pass through, a second light emitting surface 13036 reflecting the light which passes through the second light incident surface 13035, and a third light reflective surface 13037 reflecting the light which comes from the second light emitting surface 13036. After reflected on the third light reflective surface 13037, the light is emitted from the second light emitting surface 13036 at a right angle.

The light incident surface 13031, the first light reflective surface 13032 and the light emitting surface 13033 are disposed adjacent to each other, or they have connecting surfaces connected therebetween. The second light emitting surface 13036, the second light incident surface 13035 and the third light reflective surface 13037 are disposed adjacent to each other, or they have connecting surfaces connected therebetween. The second light incident surface 13035 of the second light path turning element 1303B is disposed towards the light emitting surface 13033. The second light incident surface 13035 and the light emitting surface 13033 are disposed in parallel to each other and have an air gap therebetween. Alternatively, the first light path turning element 1303A and the second light path turning element 1303B are attached to each other without any air gap therebetween. In operation, the light is emitted from the light emitting surface 13033, passes through the second light incident surface 13035, enters the second light path turning element 1303B, is reflected on the second light emitting surface 13036, reaches and is reflected on the third light reflective surface 13037, and is emitted from the second light emitting surface 13036 at a right angle. The lens module 1301 may be disposed above the light incident surface 13031 and distant from the image forming unit 1302.

Figure 16:
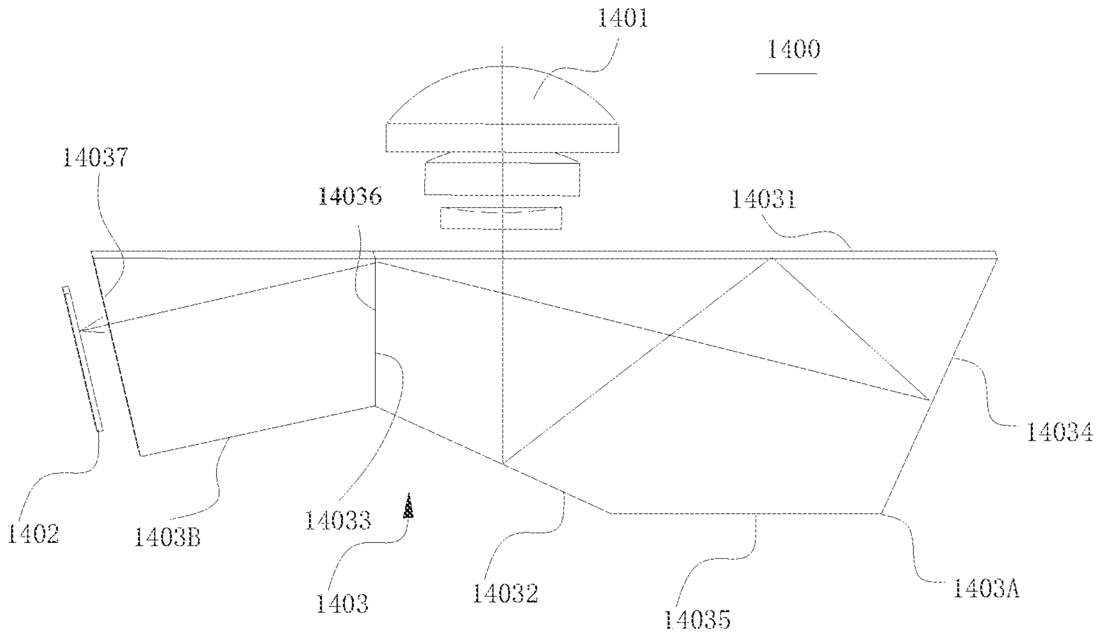
FIG. 16 is a schematic view of a lens device in accordance with a fourteenth embodiment of the invention.

FIG. 16 is a schematic view of a lens device 1400 in accordance with a fourteenth embodiment of the invention. A part of the fourteenth embodiment is same as or similar to those of the above embodiments and therefore the descriptions thereof are omitted. As shown in FIG. 16, the lens device 1400 includes a lens module 1401, an image forming unit 1402, and a light path turning module 1403 disposed between the lens module 1401 and the image forming unit 1402.

In the fourteenth embodiment, the light path turning module 1403 includes a first light path turning element 1403A and a second light path turning element 1403B. The first light path turning element 1403A includes a light incident surface 14031 on which the light emitted from the lens module 1401 is incident at a right angle, a first light reflective surface 14032 reflecting the light back to the light incident surface 14031 after the light is incident on the light incident surface 14031 at a right angle, a second light reflective surface 14034 reflecting the light after the light reflected back to the light incident surface 14031 is reflected on the light incident surface 14031 and reaches the second light reflective surface 14034, and a first light emitting surface 14033 allowing the light to pass through after the light is reflected on the second light reflective surface 14034. After passing through the first light emitting surface 14033, the light enters the second light path turning element 1403B. The second light path turning element 1403B includes a second light incident surface 14036 and a second light emitting surface 14037. The second light incident surface 14036 and the first light emitting surface 14033 are disposed in contact with each other to form a plane. The light is refracted on the plane, enters the second light path turning element 1403B, is emitted from the second light emitting surface 14037, and enters the image forming unit 1402.

A light absorbing stop is attached to the first light emitting surface 14033 or the second light incident surface 14036. Similar to that of the fourth embodiment, the light absorbing stop of the fourteenth embodiment may be made of black light-proof material that is coated on the first light emitting surface 14033 or the second light incident surface 14036, or may be a light-proof sheet attached to the first light emitting surface 14033 or the second light incident surface 14036 through adhesive.

The first light reflective surface 14032 and the second light reflective surface 14034 may have one or more connecting surfaces 14035 connected therebetween. The connection of the connecting surfaces 14035 to the first light reflective surface 14032 and the second light reflective surface 14034 is close to the edges of the first light reflective surface 14032 and the second light reflective surface 14034 where the light is reflected. The connecting surfaces 14035 may be planar or formed into a concave structure. In the fourteenth embodiment depicted by the figure, the connecting surface 14035 is planar. When the connecting surface 14035 is a concave surface, it is preferred that the connecting surface 14035 is slightly deeper than the intersection of the peripheral light reflected by the first light reflective surface 14032 and the peripheral light reflected by the second light reflective surface 14034, and a light absorbing film is attached to the connecting surface 14035.

The lens module 1401 may be disposed above the light incident surface 14031, disposed at a side of the light path turning module 1403 near the image forming unit 1402, or disposed at the center of the light incident surface 14031. In the fourteenth embodiment, the light experiences three reflections and one refraction and is emitted. Therefore, the lens device 1400 can have an increased back focal length.

Figure 17:
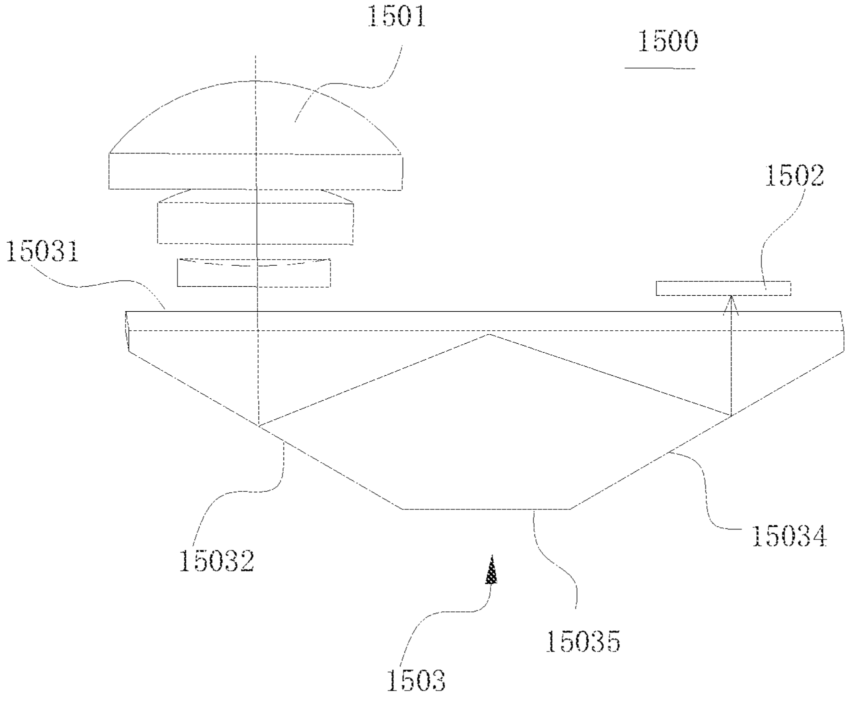
FIG. 17 is a schematic view of a lens device in accordance with a fifteenth embodiment of the invention.

FIG. 17 is a schematic view of a lens device 1500 in accordance with a fifteenth embodiment of the invention. A part of the fifteenth embodiment is same as or similar to those of the above embodiments and therefore the descriptions thereof are omitted. As shown in FIG. 17, the lens device 1500 includes a lens module 1501, an image forming unit 1502, and a light path turning module 1503 disposed between the lens module 1501 and the image forming unit 1502.

The light path turning module 1503 includes a light incident surface 15031 on which the light emitted from the lens module 1501 is incident at a right angle, a first light reflective surface 15032 reflecting the light back to the light incident surface 15031 after the light is incident on the light incident surface 15031 at a right angle, and a second light reflective surface 15034 reflecting the light to the light incident surface 15031 at a right angle after the light reflected back to the light incident surface 15031 is reflected on the light incident surface 15031 and reaches the second light reflective surface 15034. The light incident surface 15031 is disposed towards the image forming unit 1502. The lens module 1501 may be disposed above the light incident surface 15031 and distant from the image forming unit 1502.

The first light reflective surface 15032 and the second light reflective surface 15034 may have one or more connecting surfaces 15035 connected therebetween. The connection of the connecting surfaces 15035 to the first light reflective surface 15032 and the second light reflective surface 15034 is close to the edges of the first light reflective surface 15032 and the second light reflective surface 15034 where the light is reflected. Such arrangement is advantageous to reduction of the thickness of the light path turning module 1503. The connecting surfaces 15035 may be planar or formed into a concave structure. In the fourteenth embodiment depicted by the figure, the connecting surface 15035 is planar. When the connecting surface 15035 is a concave surface, it is preferred that the connecting surface 15035 is slightly deeper than the intersection of the peripheral light reflected by the first light reflective surface 15032 and the peripheral light reflected by the second light reflective surface 15034, and a light absorbing film is attached to the connecting surface 15035.

Figure 18:
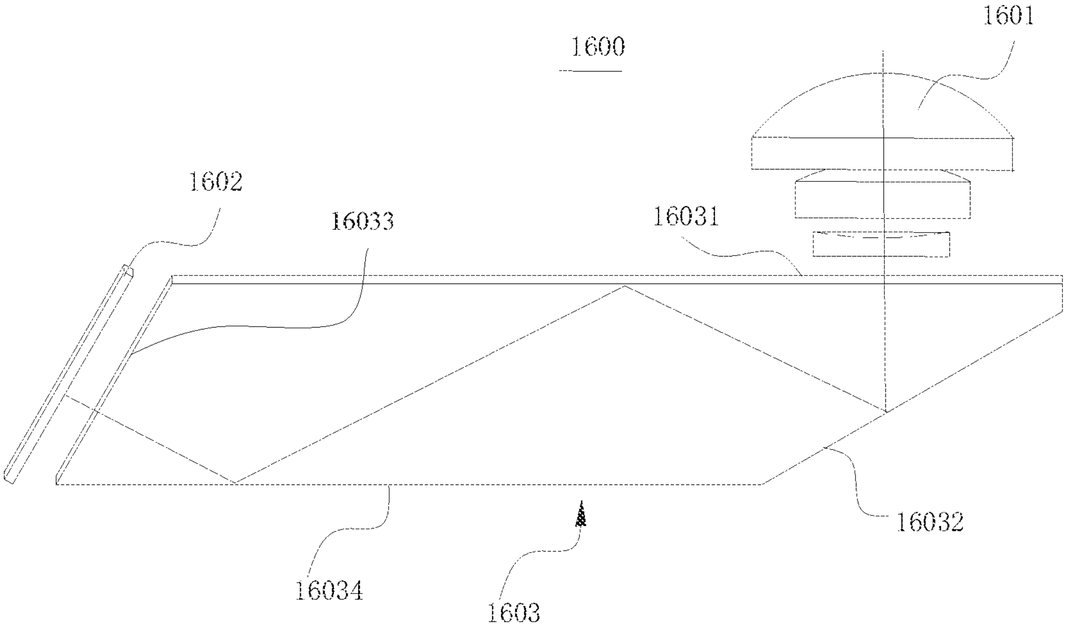
FIG. 18 is a schematic view of a lens device in accordance with a sixteenth embodiment of the invention.

FIG. 18 is a schematic view of a lens device 1600 in accordance with a sixteenth embodiment of the invention. A part of the sixteenth embodiment is same as or similar to those of the above embodiments and therefore the descriptions thereof are omitted. As shown in FIG. 18, the lens device 1600 includes a lens module 1601, an image forming unit 1602, and a light path turning module 1603 disposed between the lens module 1601 and the image forming unit 1602.

The light path turning module 1603 includes a light incident surface 16031 on which the light emitted from the lens module 1601 is incident at a right angle, a first light reflective surface 16032 reflecting the light back to the light incident surface 16031 after the light is incident on the light incident surface 16031 at a right angle, a second light reflective surface 16034 reflecting the light which comes from the light incident surface 16031 after the light reflected back to the light incident surface 16031 is reflected on the light incident surface 16031, and a light emitting surface 16033. The light emitting surface 16033 is disposed towards the image forming unit 1602. In operation, the light is incident on the light incident surface 16031, reaches and is reflected on the first light reflective surface 16032, reaches and is reflected on the light incident surface 16031, reaches and is reflected on the second light reflective surface 16034, and is emitted from the light emitting surface 16033. The lens module 1601 may be disposed above the light incident surface 16031 and distant from the image forming unit 1602. The second light reflective surface 16034 is connected between the first light reflective surface 16032 and the light emitting surface 16033. The connection of the second light reflective surface 16034 to the first light reflective surface 16032 is close to the edge of the first light reflective surface 16032 where the light is reflected. Such arrangement is advantageous to reduction of the thickness of the light path turning module 1603.

Figure 19:
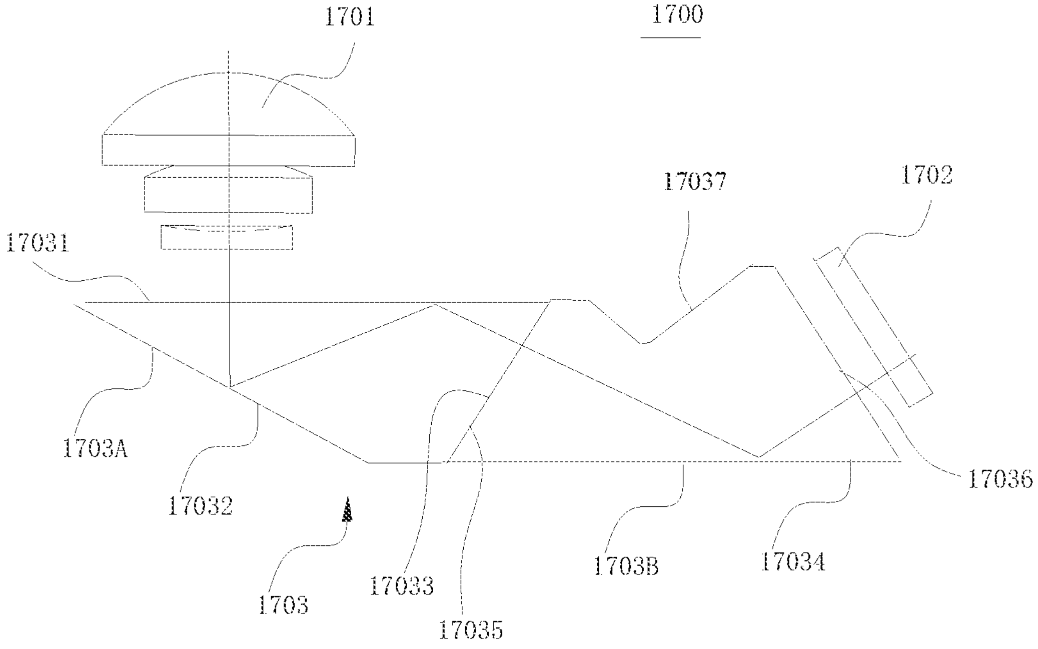
FIG. 19 is a schematic view of a lens device in accordance with a seventeenth embodiment of the invention.

FIG. 19 is a schematic view of a lens device 1700 in accordance with a seventeenth embodiment of the invention. A part of the seventeenth embodiment is same as or similar to those of the above embodiments and therefore the descriptions thereof are omitted. The seventeenth embodiment is modified from the third embodiment. As shown in FIG. 19, the lens device 1700 includes a lens module 1701, an image forming unit 1702, and a light path turning module 1703 disposed between the lens module 1701 and the image forming unit 1702.

The light path turning module 1703 includes a first light path turning element 1703A and a second light path turning element 1703B. The first light path turning element 1703A includes a light incident surface 17031 on which the light emitted from the lens module 1701 is incident at a right angle, a first light reflective surface 17032 reflecting the light back to the light incident surface 17031 after the light is incident on the light incident surface 17031 at a right angle, and a light emitting surface 17033 allowing the light to pass through after the light reflected back to the light incident surface 17031 is reflected on the light incident surface 17031. After passing through the light emitting surface 17033, the light enters the second light path turning element 1703B. The second light path turning element 1703B includes a second light incident surface 17035 allowing the light emitted from the light emitting surface 17033 to pass through, a second light reflective surface 17034 reflecting the light which passes through the second light incident surface 17035, and a light emitting surface 17036. The light emitting surface 17036 is disposed towards the image forming unit 1702. The light is incident on the light incident surface 17031, reaches and is reflected on the first reflective surface 17032, reaches and is reflected on the the light incident surface 17031, reaches and is reflected on the second light reflective surface 17034, and is emitted from the second light emitting surface 17033. The lens module 1701 is disposed at a side of the light incident surface 17031 and distant from the image forming unit 1702. The second light reflective surface 17034 is connected between the second light incident surface 17035 and the light emitting surface 17033.

One or more connecting surfaces 17037 are concave and are formed on the light incident surface 17031. The connection of the connecting surfaces 17037 to the light incident surface 17031 is close to the edges of the light incident surface 17031 and the second light reflective surface 17034 where the light is reflected. It is preferred that the junction point of the connecting surfaces 17037 is slightly deeper than the intersection of the peripheral light reflected by the light incident surface 17031 and the second light reflective surface 17034, and a light absorbing film is attached to the connecting surfaces 17037.

In all the above embodiments, a light absorbing stop can be disposed between the first light path turning element and the second light path turning element if the light path turning module is provided with the first light path turning element and the second light path turning element.

The light path turning modules of the first embodiment to the sixth embodiment can be replaced with those of the seventh embodiment to the seventeenth embodiment. However, the invention is not limited thereto. The light path turning module of the invention is configured to reflect the light at least twice for improving the space utilization and increasing the back focal length.

Figure 20:
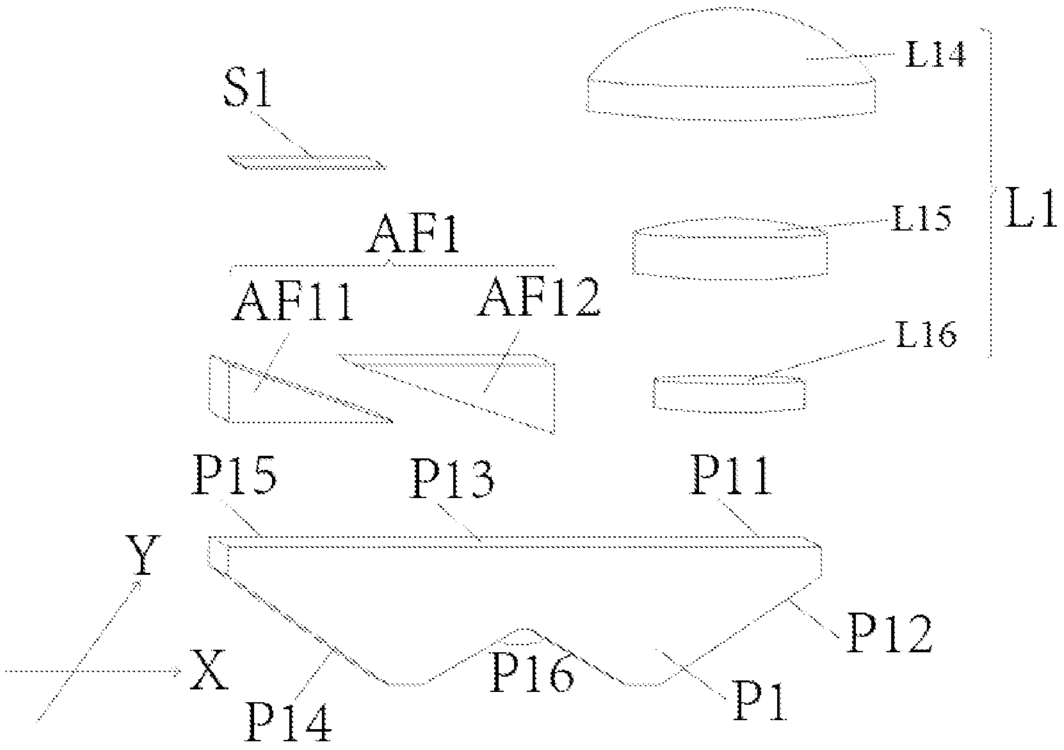
FIG. 20 is an exploded view of a lens device in accordance with an eighteenth embodiment of the invention.
Figure 21:
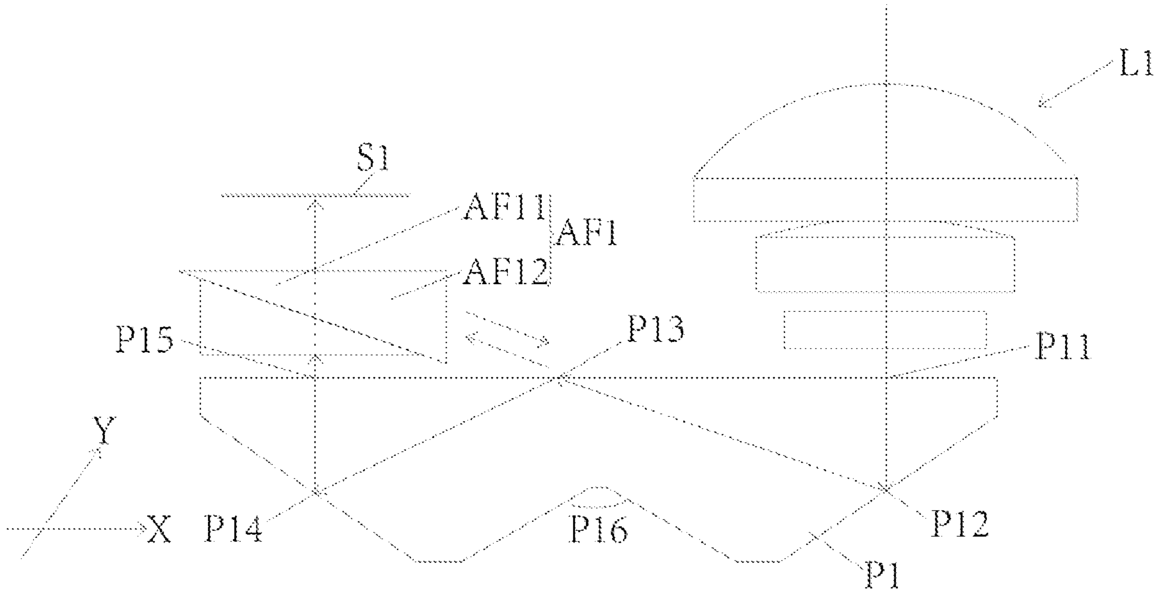
FIG. 21 is a schematic view showing the light path of the lens device in accordance with the eighteenth embodiment of the invention.

FIGS. 20 and 21 depict a lens device in accordance with the eighteenth embodiment of the invention. The lens device includes a lens module L1, a light path turning module P1 and an image forming unit S1 which are arranged in order from an object side to an image side along a light path. The light path turning module P1 is disposed between the lens module L1 and the image forming unit S1. A light incident surface P11 of the light path turning module P1 is perpendicular to the optical axis (not shown) of the lens module L1. The light coming from the lens module L1 travels through the light path turning module P1 to the image forming unit S1. In the light path turning module P1, the light experiences plural reflections so that the light path is changed. By means of the plural reflections, the lens device not only has a high magnification focal length but has the volume thereof reduced to the minimum. All the elements of the lens device are described in detail below.

As shown in FIG. 20, the lens module L1 includes a first lens L14, a second lens L15 and a third lens L16 which are arranged in order from the object side to the image side. The first lens L14 is with positive refractive power. The second lens L15 is a meniscus lens. The lens module L1 is movable in a direction parallel to an XY plane to perform vibration compensation operation, thereby achieving the function of optical image stabilization (OIS). In the eighteenth embodiment, the lens module L1 has three lenses. However, the eighteenth embodiment is only an exemplary embodiment for descriptions and the invention is not limited thereto. The lens module L1 may have a different number of lenses (e.g. one, two, four or more lenses), all belongs to the category of the invention.

The light path turning module P1 is a substantially W-shaped prism and includes a light incident surface P11, a first light reflective surface P12, a second light reflective surface P13, a third light reflective surface P14 and a light emitting surface P15. Specifically, the light incident surface P11 of the light path turning module P1 is perpendicular to the optical axis of the lens module L1. The first light reflective surface P12 meets or connects to the light incident surface P11. The second light reflective surface P13 and the light incident surface P11 are coplanar. The third light reflective surface P14 meets or connects to the first light reflective surface P12 and the light emitting surface P15. The light emitting surface P15, the second light reflective surface P13 and the light incident surface P11 are coplanar. The lens module L1 is disposed corresponding to the light incident surface P11 of the light path turning module P1. Specifically, the lens module L1 is disposed above the light incident surface P11 of the light path turning module P1 and at a side of the light path turning module P1 distant from the image forming unit S1, and the lens module L1 and the image forming unit S1 are disposed at the same side of the light path turning module P1. Such arrangement is advantageous to installation of the lens device in a limited space, an application of the lens device to a high-level long focus lens with a longer effective focal length (EFL) and a longer back focal length (BFL), and improvement of the space utilization.

As shown in FIG. 21, light is emitted from the lens module L1, enters the light path turning module P1 through the light incident surface P11, is sequentially reflected on the first light reflective surface P12, the second light reflective surface P13 and the third light reflective surface P14, and is emitted from the light emitting surface P15. It is therefore understood that the light experiences three reflections in the light path turning module P1 and the travel direction of the light is changed three times so that the light path in the light path turning module P1 is W-shaped.

Preferably, a concave structure P16 is provided between the first light reflective surface P12 and the third light reflective surface P14 for blocking the light that does not travel along the above-mentioned light path (the main light path). Because of the concave structure P16, the bottom of the light path turning module P1 is W-shaped for blocking the light that does not travel along the main light path (i.e. for eliminating the ghost images). Specifically, the concave structure P16 is configured to block a part of peripheral light reflected in the interior of the light path turning module P1. Therefore, the shape of the light path turning module P1 can be modified by removing a part of the light path turning module P1 which is outside the main light path. The depth of the concave structure P16 is determined in accordance with the extent of the ghost images. The goal is to totally block the marginal light that causes the ghost images, thereby reducing the ghost images and improving the quality of the formed images of the lens device. The concave structure P16 may have a light absorbing film provided thereon. The light absorbing film may be made of black light-proof material that is coated on the concave structure P16, or may be a light proof element attached to the concave structure P16.

In the eighteenth embodiment, the lens device further includes a focusing unit AF1 for changing the optical path length between the lens module L1 and the image forming unit S1. The focusing unit AF1 is disposed between the light path turning module P1 and the image forming unit S1 and includes a first focusing element AF11 and a second focusing element AF12. The first focusing element AF11 and the second focusing element AF12 have a relative movement therebetween to change the optical path length h for the focusing unit AF1 whereby the auto focus operation of the lens device is performed.

Figure 22:
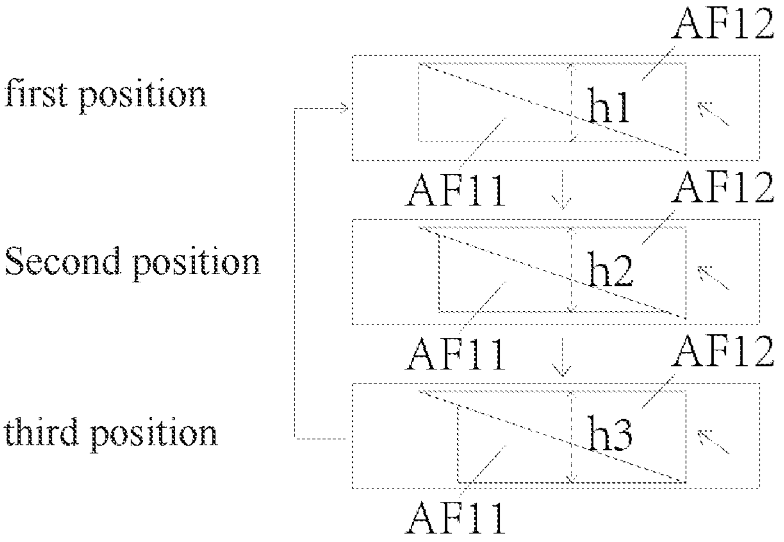
FIG. 22 is a schematic view showing the auto focus operation of the lens device in accordance with the eighteenth embodiment of the invention.

In the eighteenth embodiment, the first focusing element AF11 and the second focusing element AF12 are prisms. Preferably, the first focusing element AF11 and the second focusing element AF12 are wedge-shaped prisms. Specifically, the first focusing element AF11 and the second focusing element AF12 are right triangular when observed in the Y direction of FIG. 20. The dimension of the first focusing element AF11 measured along the optical axis is gradually reduced in the X direction from an end which is distant from the lens module L1 to another end which is close to the lens module L1. The dimension of the second focusing element AF12 measured along the optical axis is gradually reduced in the X direction from an end which is close to the lens module L1 to another end which is distant from the lens module L1. An inclined surface of the first focusing element AF11 and that of the second focusing element AF12 are disposed towards each other so that the whole focusing unit AF1 is substantially a cuboid unit or a cubic unit. In the eighteenth embodiment, the first focusing element AF11 is stationary. The second focusing element AF12 can be moved in a direction parallel to the inclined surface of the first focusing element AF11, namely in a direction away from the light emitting surface P15 at an angle greater than 0° and less than 90°. The first focusing element AF11 and the second focusing element AF12 have a relative movement therebetween in opposite directions so as to change the optical path length h for the light which passes through the focusing unit AF1, whereby the auto focus operation of the lens device is performed. Referring to FIG. 22, the optical path length for the light which passes through the focusing unit AF1 is h1 when the second focusing element AF12 is in a first position. The optical path length for the light which passes through the focusing unit AF1 is h2 when the second focusing element AF12 is in a second position. The optical path length for the light which passes through the focusing unit AF1 is h3 when the second focusing element AF12 is in a third position. It is worth noting that h1>h2>h3. That is, the optical path length h for the light which passes through the focusing unit AF1 is changed.

Figure 23:
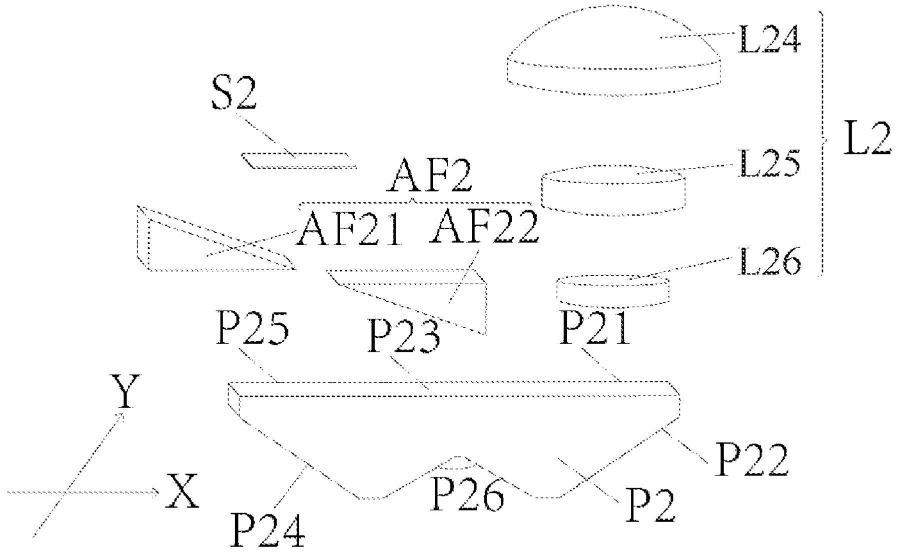
FIG. 23 is an exploded view of a lens device in accordance with a nineteenth embodiment of the invention.

A nineteenth embodiment of the invention, as shown in FIG. 23, is similar to the eighteenth embodiment. The lens device includes a lens module L2, a light path turning module P2, a focusing unit AF2 and an image forming unit S2 which are arranged in order from an object side to an image side along a light path. The lens module L2 includes a first lens L24, a second lens L25 and a third lens L26. In the nineteenth embodiment, the lens module L2 has three lenses. However, the nineteenth embodiment is only an exemplary embodiment for descriptions and the invention is not limited thereto. The lens module L2 may have a different number of lenses (e.g. one, two, four or more lenses), all belongs to the category of the invention. The lens module L2 is movable in a direction parallel to an XY plane to perform vibration compensation operation, thereby achieving the function of optical image stabilization (OIS). The light path turning module P2 includes a light incident surface P21, a first light reflective surface P22, a second light reflective surface P23, a third light reflective surface P24 and a light emitting surface P25. The light emitting surface P25, the second light reflective surface P23 and the light incident surface P21 are coplanar. A concave structure P26 is provided between the first light reflective surface P22 and the third light reflective surface P24 for blocking the light that travels to the concave structure P26 along a light path different from the main light path. The focusing unit AF2 includes a first focusing element AF21 and a second focusing element AF22. The lens module L2 is disposed corresponding to the light incident surface P21 of the light path turning module P2. Specifically, the lens module L2 is disposed above the light incident surface P21 of the light path turning module P2 and at a side of the light path turning module P2 distant from the image forming unit S2, and the lens module L2 and the image forming unit S2 are disposed at the same side of the light path turning module P2. Such arrangement is advantageous to installation of the lens device in a limited space, an application of the lens device to a high-level long focus lens with a longer effective focal length (EFL) and a longer back focal length (BFL), and improvement of the space utilization.

Figure 24:
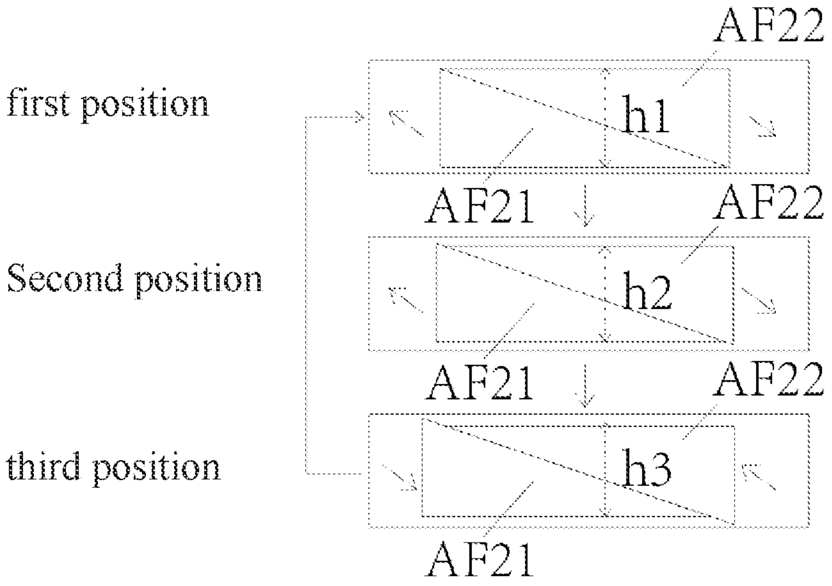
FIG. 24 is a schematic view showing the auto focus operation of the lens device in accordance with the nineteenth embodiment of the invention.

Referring to FIG. 24, the nineteenth embodiment differs from the eighteenth embodiment in that both of the first focusing element AF21 and the second focusing element AF22 are movable. The first focusing element AF21 and the second focusing element AF22 can be moved in a direction parallel to their inclined surfaces, namely in a direction away from the light emitting surface P25 at an angle greater than 0° and less than 90°. The first focusing element AF21 and the second focusing element AF22 have a relative movement therebetween in opposite directions so as to change the optical path length h for the light which passes through the focusing unit AF2, whereby the auto focus operation of the lens device is performed. Specifically, the optical path length for the light which passes through the focusing unit AF2 is h1 when the second focusing element AF22 is in a first position with respect to the first focusing element AF21. The optical path length for the light which passes through the focusing unit AF2 is h2 when the second focusing element AF22 is in a second position with respect to the first focusing element AF21. The optical path length for the light which passes through the focusing unit AF2 is h3 when the second focusing element AF22 is in a third position with respect to the first focusing element AF21. It is worth noting that h1>h2>h3. That is, the optical path length h for the light which passes through the focusing unit AF2 is changed.

Figure 25:
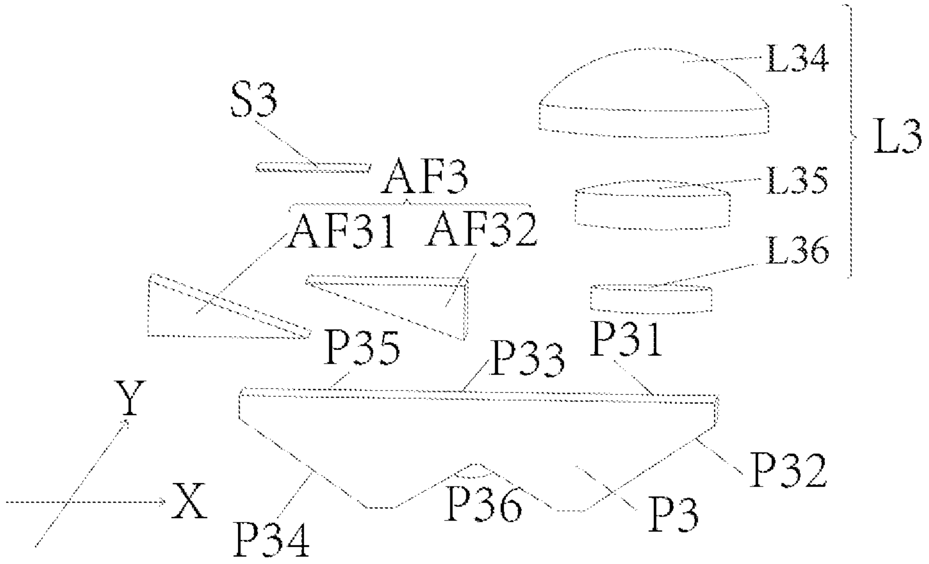
FIG. 25 is an exploded view of a lens device in accordance with a twentieth embodiment of the invention.

A twentieth embodiment of the invention, as shown in FIG. 25, is similar to the eighteenth embodiment. The lens device includes a lens module L3, a light path turning module P3, a focusing unit AF3 and an image forming unit S3 which are arranged in order from an object side to an image side along a light path. The lens module L3 includes a first lens L34, a second lens L35 and a third lens L36. In the twentieth embodiment, the lens module L3 has three lenses. However, the twentieth embodiment is only an exemplary embodiment for descriptions and the invention is not limited thereto. The lens module L3 may have a different number of lenses (e.g. one, two, four or more lenses), all belongs to the category of the invention. The lens module L3 is movable in a direction parallel to an XY plane to perform vibration compensation operation, thereby achieving the function of optical image stabilization (OIS). The light path turning module P3 includes a light incident surface P31, a first light reflective surface P32, a second light reflective surface P33, a third light reflective surface P34 and a light emitting surface P35. The light emitting surface P35, the second light reflective surface P33 and the light incident surface P31 are coplanar. A concave structure P36 is provided between the first light reflective surface P32 and the third light reflective surface P34 for blocking the light that travels to the concave structure P36 along a light path different from the main light path. The focusing unit AF3 includes a first focusing element AF31 and a second focusing element AF32. The lens module L3 is disposed corresponding to the light incident surface P31 of the light path turning module P3. Specifically, the lens module L3 is disposed above the light incident surface P31 of the light path turning module P3 and at a side of the light path turning module P3 distant from the image forming unit S3, and the lens module L3 and the image forming unit S3 are disposed at the same side of the light path turning module P3. Such arrangement is advantageous to installation of the lens device in a limited space, an application of the lens device to a high-level long focus lens with a longer effective focal length (EFL) and a longer back focal length (BFL), and improvement of the space utilization.

Figure 26:
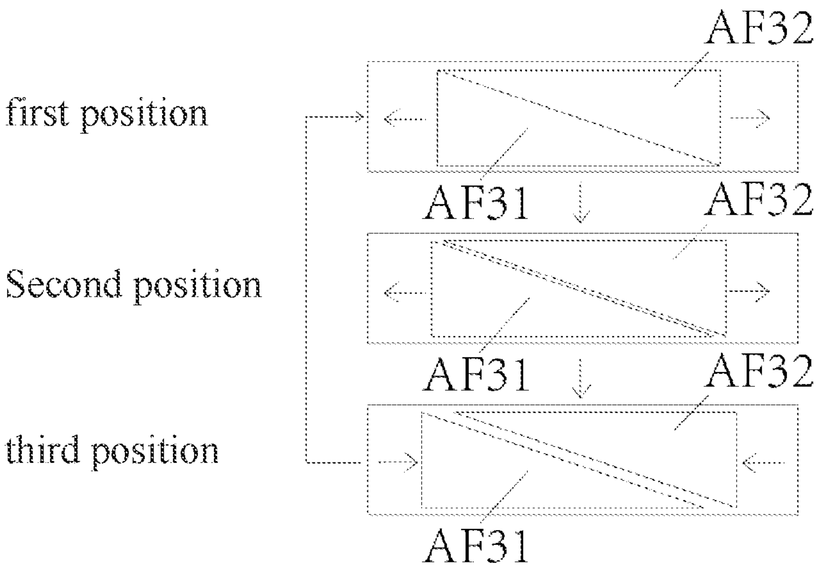
FIG. 26 is a schematic view showing the auto focus operation of the lens device in accordance with the twentieth embodiment of the invention.

Referring to FIG. 26, the twentieth embodiment differs from the eighteenth embodiment in that both of the first focusing element AF31 and the second focusing element AF32 are movable. The first focusing element AF31 and the second focusing element AF32 can be moved in an X-direction, namely in a direction away from the light emitting surface P35 at 0° or parallel to the light emitting surface P35. The first focusing element AF31 and the second focusing element AF32 have a relative movement therebetween in opposite directions so as to change the optical path length h for the light which passes through the focusing unit AF3, whereby the auto focus operation of the lens device is performed. Specifically, the second focusing element AF32 and the first focusing element AF31 are tightly in contact with each other when the second focusing element AF32 is in a first position with respect to the first focusing element AF31. The second focusing element AF32 and the first focusing element AF31 are separated with an air gap formed therebetween when the second focusing element AF32 is in a second position with respect to the first focusing element AF31. The air gap between the second focusing element AF32 and the first focusing element AF31 is larger when the second focusing element AF32 is in a third position with respect to the first focusing element AF31. Since the air gap between the second focusing element AF32 and the first focusing element AF31 is changed, the optical path length is increased, whereby the auto focus operation of the lens device is performed.

Figure 27:
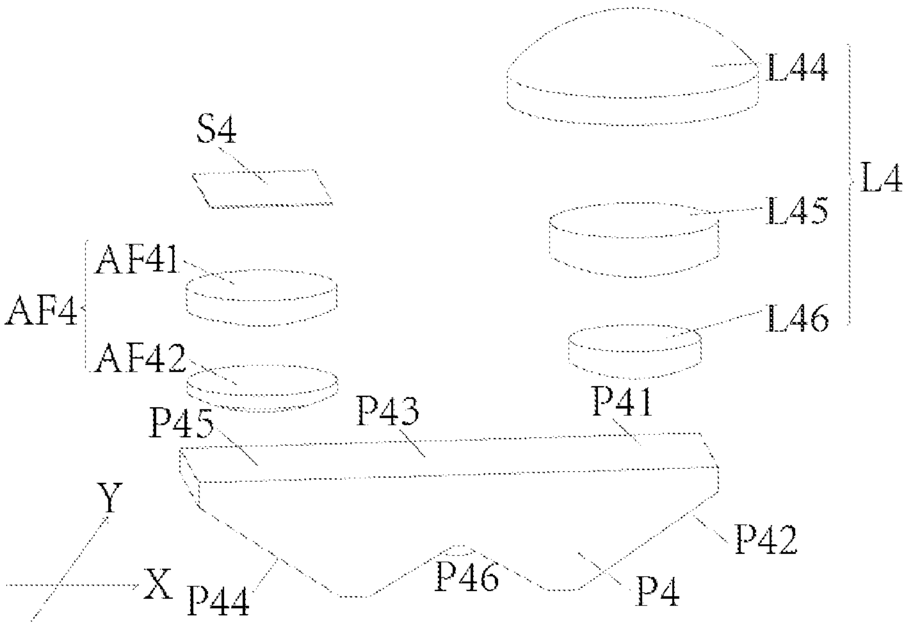
FIG. 27 is an exploded view of a lens device in accordance with a twenty-first embodiment of the invention.
Figure 28:
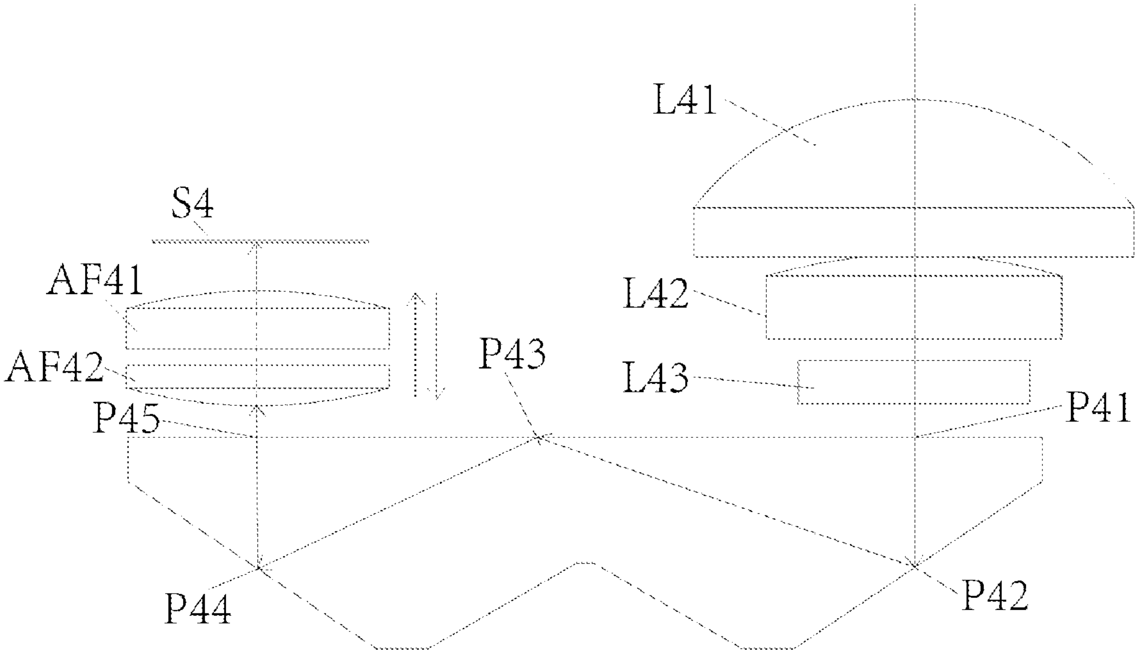
FIG. 28 is a schematic view showing the light path of the lens device in accordance with the twenty-first embodiment of the invention.

A twenty-first embodiment of the invention, as shown in FIGS. 27 and 28, is similar to the eighteenth embodiment. The lens device includes a lens module L4, a light path turning module P4, a focusing unit AF4 and an image forming unit S4 which are arranged in order from an object side to an image side along a light path. The lens module L4 includes a first lens L44, a second lens L45 and a third lens L46. In the twenty-first embodiment, the lens module L4 has three lenses. However, the twenty-first embodiment is only an exemplary embodiment for descriptions and the invention is not limited thereto. The lens module L4 may have a different number of lenses (e.g. one, two, four or more lenses), all belongs to the category of the invention. The lens module L4 is movable in a direction parallel to an XY plane to perform vibration compensation operation, thereby achieving the function of optical image stabilization (OIS). The light path turning module P4 includes a light incident surface P41, a first light reflective surface P42, a second light reflective surface P43, a third light reflective surface P44 and a light emitting surface P45. The light emitting surface P45, the second light reflective surface P43 and the light incident surface P41 are coplanar. A concave structure P46 is provided between the first light reflective surface P42 and the third light reflective surface P44 for blocking the light that travels to the concave structure P46 along a light path different from the main light path. The focusing unit AF4 includes a first focusing element AF41 and a second focusing element AF42. The lens module L4 is disposed corresponding to the light incident surface P41 of the light path turning module P4. Specifically, the lens module L4 is disposed above the light incident surface P41 of the light path turning module P4 and at a side of the light path turning module P4 distant from the image forming unit S4, and the lens module L4 and the image forming unit S4 are disposed at the same side of the light path turning module P4. Such arrangement is advantageous to installation of the lens device in a limited space, an application of the lens device to a high-level long focus lens with a longer effective focal length (EFL) and a longer back focal length (BFL), and improvement of the space utilization.

The twenty-first embodiment differs from the eighteenth embodiment in that both of the first focusing element AF41 and the second focusing element AF42 are movable lenses. The first focusing element AF41 and the second focusing element AF42 can be moved with respect to each other in a Z-direction, namely in a direction away from the light emitting surface P45 at 90° or perpendicular to the light emitting surface P45. The first focusing element AF41 and the second focusing element AF42 have a relative movement therebetween in the same direction which is parallel to the optical axis of the lens module L4, so as to perform the auto focus operation of the lens device. In the twenty-first embodiment, the focusing unit AF4 has two lenses. However, the twenty-first embodiment is only an exemplary embodiment for descriptions and the invention is not limited thereto. The focusing unit AF4 may have a different number of lenses (e.g. one, three, four or more lenses), all belongs to the category of the invention.

Figure 29:
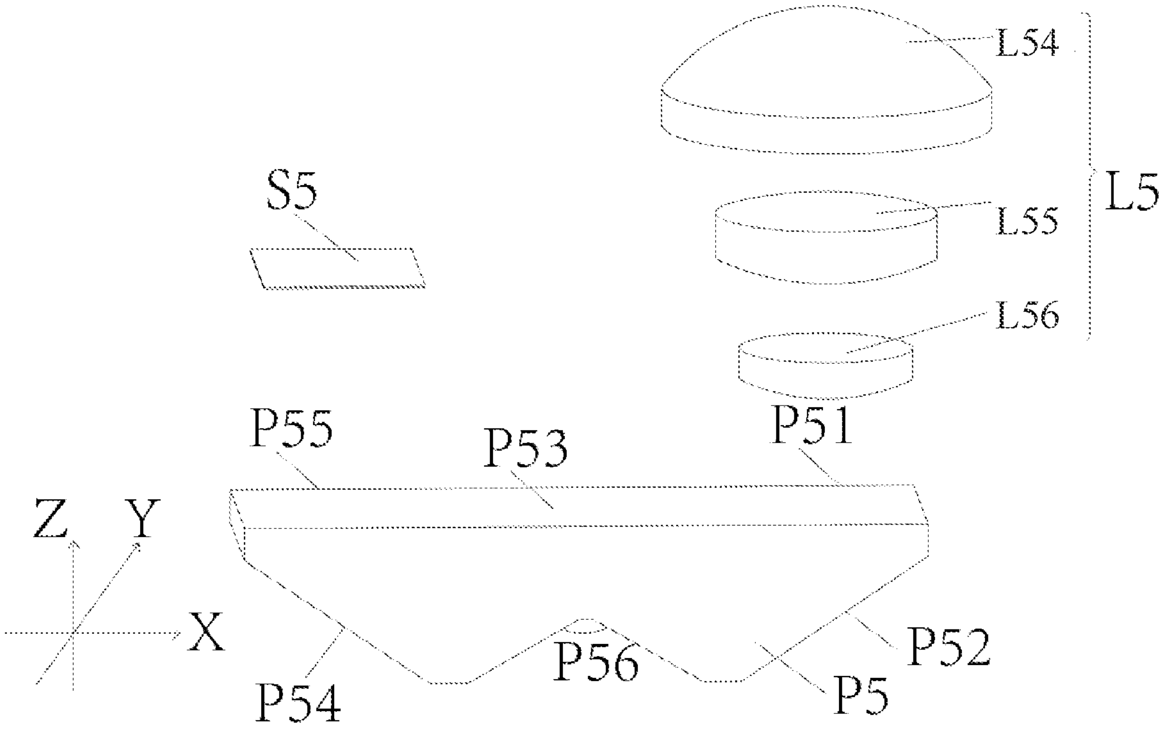
FIG. 29 is an exploded view of a lens device in accordance with a twenty-second embodiment of the invention.

A twenty-second embodiment of the invention, as shown in FIG. 29, is similar to the eighteenth embodiment. The lens device includes a lens module L5, a light path turning module P5 and an image forming unit S5 which are arranged in order from an object side to an image side along a light path. The lens module L5 includes a first lens L54, a second lens L55 and a third lens L56. In the twenty-second embodiment, the lens module L5 has three lenses. However, the twenty-second embodiment is only an exemplary embodiment for descriptions and the invention is not limited thereto. The lens module L5 may have a different number of lenses (e.g. one, two, four or more lenses), all belongs to the category of the invention. The lens module L5 is movable in a direction parallel to an XY plane to perform vibration compensation operation, thereby achieving the function of optical image stabilization (OIS). The light path turning module P5 includes a light incident surface P51, a first light reflective surface P52, a second light reflective surface P53, a third light reflective surface P54 and a light emitting surface P55. The light emitting surface P55, the second light reflective surface P53 and the light incident surface P51 are coplanar. A concave structure P56 is provided between the first light reflective surface P52 and the third light reflective surface P54 for blocking the light that travels to the concave structure P56 along a light path different from the main light path. The lens module L5 is disposed corresponding to the light incident surface P51 of the light path turning module P5. Specifically, the lens module L5 is disposed above the light incident surface P51 of the light path turning module P5 and at a side of the light path turning module P5 distant from the image forming unit S5, and the lens module L5 and the image forming unit S5 are disposed at the same side of the light path turning module P5. Such arrangement is advantageous to installation of the lens device in a limited space, an application of the lens device to a high-level long focus lens with a longer effective focal length (EFL) and a longer back focal length (BFL), and improvement of the space utilization.

The twenty-second embodiment differs from the eighteenth embodiment in that no focusing unit is included in the twenty-second embodiment and the image forming unit S5 is used as a substitute for the focusing unit. The image unit S5 is movable in a Z direction, namely in a direction away from the light emitting surface P55 at 90° or parallel to the optical axis of the lens module L5, so as to perform the auto focus operation of the lens device.

Figure 30:
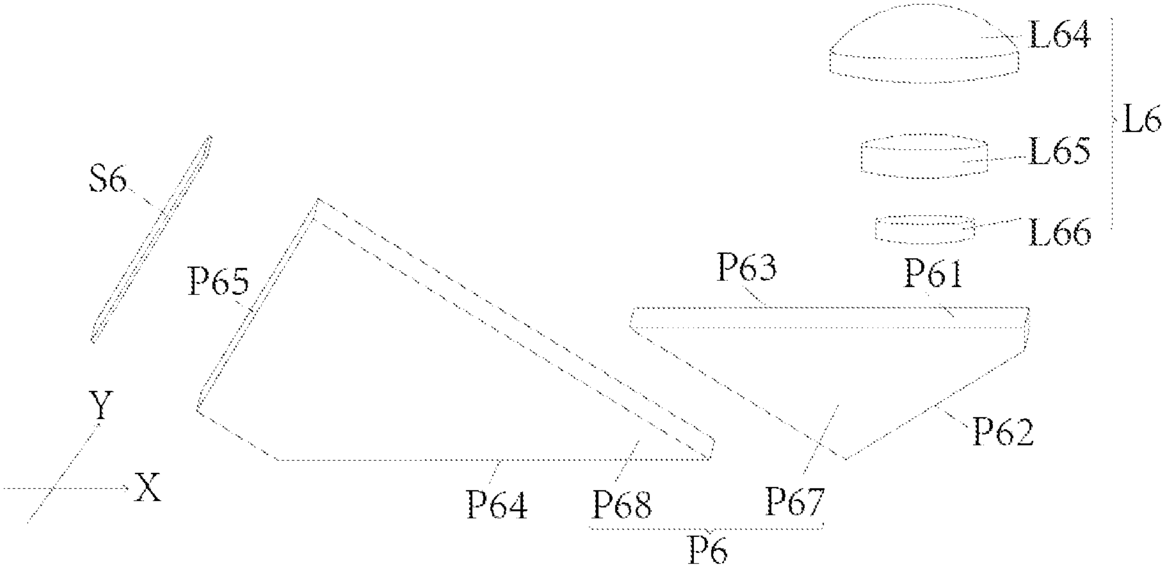
FIG. 30 is an exploded view of a lens device in accordance with a twenty-third embodiment of the invention.
Figure 31:
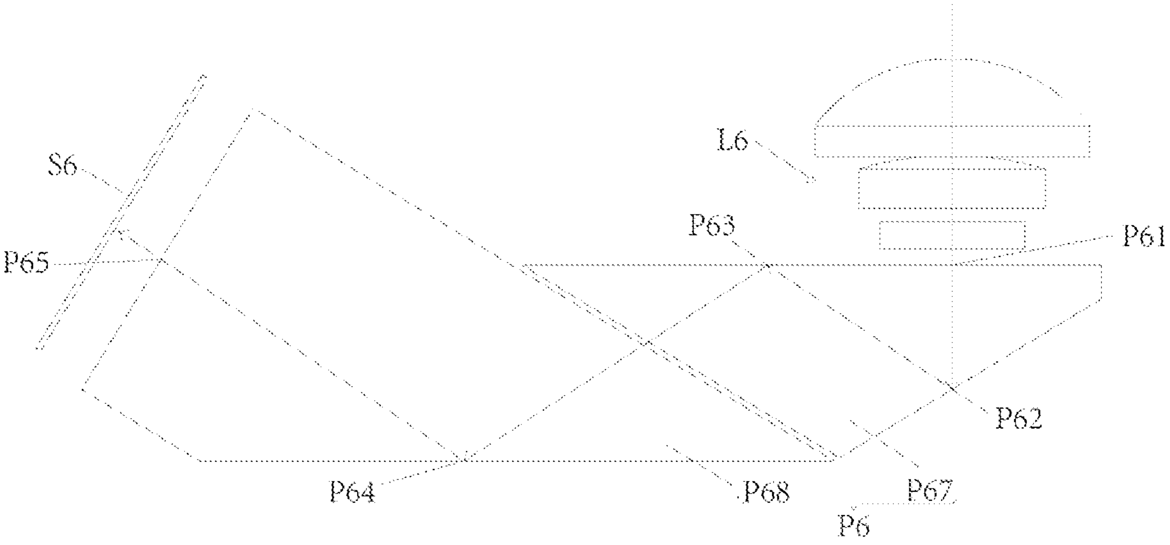
FIG. 31 is a schematic view showing the light path of the lens device in accordance with the twenty-third embodiment of the invention.

A twenty-third embodiment of the invention, as shown in FIGS. 30 and 31, is similar to the twenty-second embodiment. The lens device includes a lens module L6, a light path turning module P6 and an image forming unit S6 which are arranged in order from an object side to an image side along a light path. The lens module L6 includes a first lens L64, a second lens L65 and a third lens L66. In the twenty-third embodiment, the lens module L6 has three lenses. However, the twenty-third embodiment is only an exemplary embodiment for descriptions and the invention is not limited thereto. The lens module L6 may have a different number of lenses (e.g. one, two, four or more lenses), all belongs to the category of the invention. The lens module L6 is movable in a direction parallel to an XY plane to perform vibration compensation operation, thereby achieving the function of optical image stabilization (OIS). The lens module L6 is further movable along the optical axis thereof (in a Z direction) to perform the auto focus operation of the lens device. Therefore, the lens module L6 is capable of the auto focus (AF) operation and the optical image stabilization (OIS) operation.

The twenty-third embodiment differs from the twenty-second embodiment in that the light path turning module P6 includes a first prism P67 and a second prism P68 which have an air gap (not labeled in FIG. 30) therebetween. When observed in the Y direction of FIG. 31, the light path turning module P6 is substantially L-shaped wherein the first prism P67 is substantially isosceles triangular, and the second prism P68 is substantially right trapezoidal or trapezoid with right angles.

Specifically, as shown in FIG. 31, a light incident surface P61, a first light reflective surface P62 and a second light reflective surface P63 are provided on the first prism P67. That is, the first prism P67 includes the light incident surface P61, the first light reflective surface P62 and the second light reflective surface P63. The light incident surface P61 and the second light reflective surface P63 are coplanar. A third light reflective surface P64 and a light emitting surface P65 are provided on the second prism P68. That is, the second prism P68 includes the third light reflective surface P64 and the light emitting surface P65. The third light reflective surface P64, the light incident surface P61 and the second light reflective surface P63 are parallel to each other. The third reflective surface P64 respectively intersects a plane on which the first light reflective surface P62 lies and intersects another plane on which the light emitting surface P65 lies. The light emitting surface P65 intersects a plane on which the light incident surface P61 lies. The first prism P67 further includes a light emitting surface (not labeled in FIG. 31). The second prism P68 further includes a light incident surface (not labeled in FIG. 31). The light emitting surface and the light incident surface are disposed towards and parallel to each other. In the twenty-third embodiment, the first prism P67 and the second prism P68 have an air gap (not labeled in FIG. 31) therebetween. Specifically, the light emitting surface of the first prism P67 and the light incident surface of the second prism P68 have the air gap therebetween. The lens module L6 is disposed corresponding to the light incident surface P61 of the first prism P67 of the light path turning module P6. Specifically, the lens module L6 is disposed above the light incident surface P61 of the first prism P67 of the light path turning module P6 and at a side of the light path turning module P6 distant from the image forming unit S6, and the lens module L6 and the image forming unit S6 are disposed at the same side of the light path turning module P6. Such arrangement is advantageous to installation of the lens device in a limited space, an application of the lens device to a high-level long focus lens with a longer effective focal length (EFL) and a longer back focal length (BFL), and improvement of the space utilization.

The image forming unit S6 is disposed corresponding to the light emitting surface P65 of the second prism P68 of the light path turning module P6. Specifically, the image forming unit S6 is disposed diagonally above the second prism P68 of the light path turning module P6, and is inclined with respect to the optical axis of the lens module L6.

Figure 32:
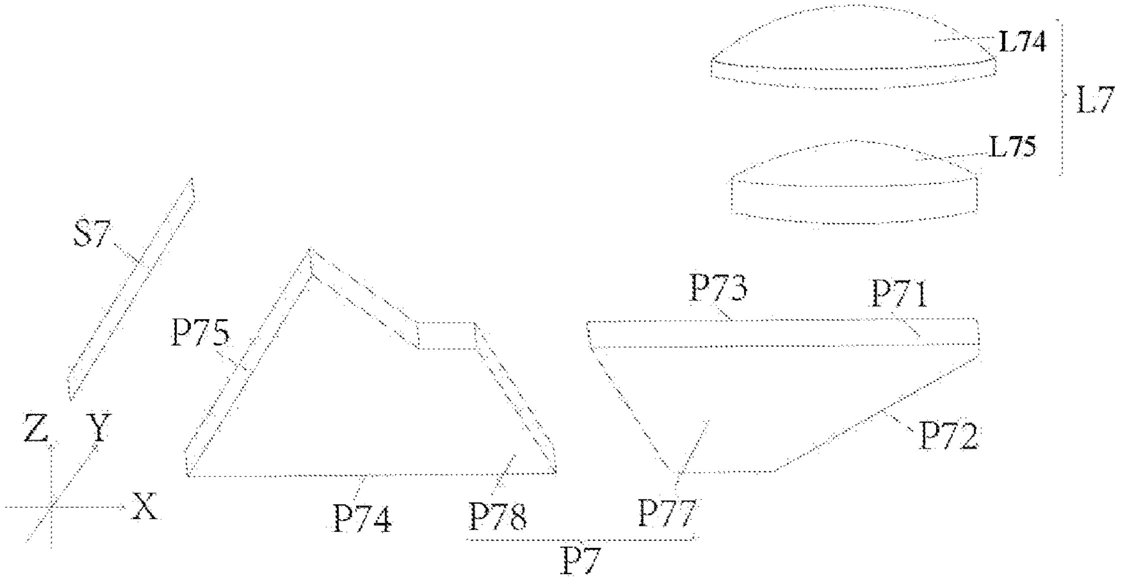
FIG. 32 is an exploded view of a lens device in accordance with a twenty-fourth embodiment of the invention.

A twenty-fourth embodiment of the invention, as shown in FIG. 32, is similar to the twenty-third embodiment. The lens device includes a lens module L7, a light path turning module P7 and an image forming unit S7 which are arranged in order from an object side to an image side along a light path. The lens module L7 is movable in a direction parallel to an XY plane to perform vibration compensation operation, thereby achieving the function of optical image stabilization (OIS). The lens module L7 is further movable along the optical axis thereof (in a Z direction) to perform the auto focus operation of the lens device. Therefore, the lens module L7 is capable of the auto focus (AF) operation and the optical image stabilization (OIS) operation.

The twenty-fourth embodiment differs from the twenty-third embodiment in that the lens module L7 consists of a first lens L74 and a second lens L75. In the twenty-fourth embodiment, the lens module L7 has two lenses. However, the twenty-fourth embodiment is only an exemplary embodiment for descriptions and the invention is not limited thereto. The lens module L7 may have a different number of lenses (e.g. one, three, four or more lenses), all belongs to the category of the invention.

Figure 33:
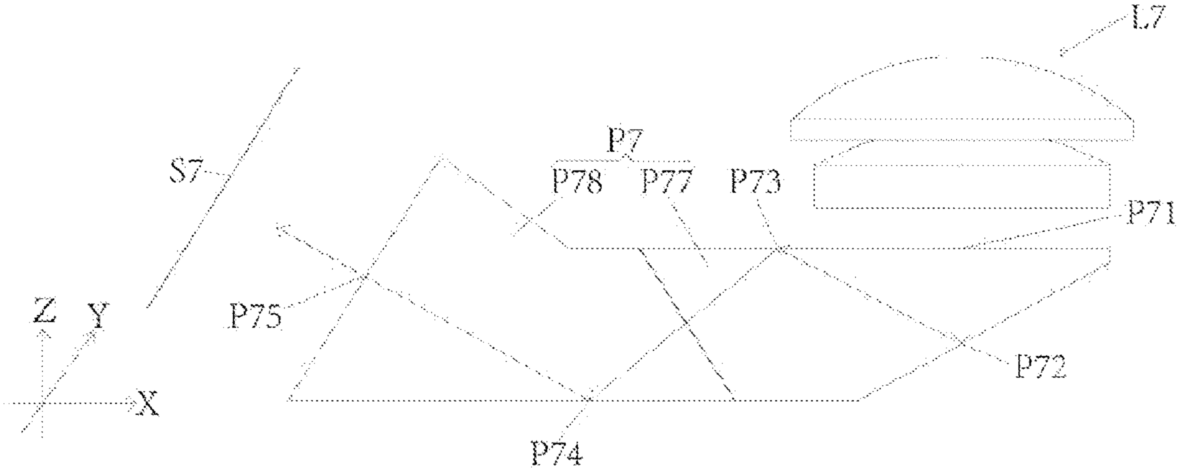
FIG. 33 is a schematic view showing the light path of the lens device in accordance with the twenty-fourth embodiment of the invention.

As shown in FIG. 33, the light path turning module P7 includes a first prism P77 and a second prism P78 which are attached to each other and have no air gap formed therebetween. However, the invention is not limited thereto. The first prism P77 and the second prism P78 may have an air gap therebetween that also belongs to the category of the invention. The first prism P77 includes a light emitting surface (not labeled in FIG. 33). The second prism P78 includes a light incident surface (not labeled in FIG. 33). The light emitting surface and the light incident surface are disposed towards and parallel to each other. In the twenty-fourth embodiment, the first prism P77 and the second prism P78 are attached to each other or have an air gap therebetween. Specifically, the light emitting surface of the first prism P77 and the light incident surface of the second prism P78 are attached to each other (as shown in FIG. 33) or have the air gap therebetween.

The lens module L7 is disposed corresponding to the light incident surface P71 of the first prism P77 of the light path turning module P7. Specifically, the lens module L7 is disposed above the light incident surface P71 of the first prism P77 of the light path turning module P7 and at a side of the light path turning module P7 distant from the image forming unit S7, and the lens module L7 and the image forming unit S7 are disposed at the same side of the light path turning module P7. Such arrangement is advantageous to installation of the lens device in a limited space, an application of the lens device to a high-level long focus lens with a longer effective focal length (EFL) and a longer back focal length (BFL), and improvement of the space utilization.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A lens device, comprising:

a lens module comprising plural lenses;

an image forming unit; and;

a light path turning module disposed between the lens module and the image forming unit;

wherein light exiting from the lens module is reflected at least twice by the light path turning module;

wherein the plural lenses comprise a first lens, a second lens, and a third lens arranged in order along an optical axis from an object side to an image side, and the lens device satisfies at least one following condition:

$$0.25 \leqq Dm1/EFL \leqq 0.65,$$

$$0.2 \leqq Dm2/EFL \leqq 0.7,$$

$$-10 < M1T - (L1\phi + L2\phi + L3\phi) < 10,$$

$$1 < M1T/GP1T < 10,$$

$$0 < (f1 + f2 + f3)/TTL < 28,$$

$$-1 < (R1 + R2)/(R3 + R4) < 3;$$

wherein Dm1 is a maximum diameter of the object side surface of the first lens for incidence of the light; Dm2 is a maximum diameter of an image side surface of the first lens for incidence of the light; L1Ø is an effective diameter of the object side surface of the first lens; L2Ø is an effective diameter of the object side surface of the second lens; L3Ø is an effective diameter of the object side of the third lens; M1T is a central thickness of the light path turning module, namely a total length of a path along which the light travels from a light incident surface of the light path turning module to a light emitting surface of the light path turning module; GP1T is a central distance from an intersection between the object side surface of the first lens and the optical axis to the light path turning module, namely a distance measured along the optical axis from the object side surface of the first lens to the light incident surface of the light path turning module; f1 is a focal length of the first lens; f2 is a focal length of the second lens; f3 is a focal length of the third lens; TTL is an optical total length along the optical axis from the object side surface of the first lens to an image forming plane; R1 is a radius of curvature of the object side surface of the first lens; R2 is a radius of curvature of the image side surface of the first lens; R3 is a radius of curvature of the object side surface of the second lens; and R4 is a radius of curvature of an image side surface of the second lens.

2. The lens device as claimed in claim 1, wherein the first lens is with positive refractive power and comprises an object side surface that is a convex surface facing the object side.

3. The lens device as claimed in claim 2, wherein the second lens is with refractive power and comprises an object side surface that is a convex surface facing the object side, and the third lens is with refractive power and comprises an object side surface that is a convex surface facing the object side.

4. The lens device as claimed in claim 3, wherein the first lens further comprises a concave surface facing the image side, the second lens is with positive refractive power and further comprises a concave surface facing the image side, and the third lens is with negative refractive power and further comprises a concave surface facing the image side.

5. The lens device as claimed in claim 3, wherein the first lens further comprises a concave surface facing the image side, the second lens is with negative refractive power and further comprises a concave surface facing the image side, and the third lens is with positive refractive power and further comprises a convex surface facing the image side.

6. The lens device as claimed in claim 1, wherein:

the light path turning module comprises the light incident surface, a first light reflective surface and the light emitting surface;

the light emitted from the lens module enters the light path turning module through the light incident surface, is reflected on the first light reflective surface back to the light incident surface, is reflected on the light incident surface to the light emitting surface, passes through the light emitting surface, and reaches the image forming unit.

7. The lens device as claimed in claim 1, wherein:

the light path turning module comprises the light incident surface, a first light reflective surface, a second light reflective surface and the light emitting surface;

the light emitted from the lens module enters the light path turning module through the light incident surface, is reflected on the first light reflective surface back to the light incident surface, is reflected on the light incident surface to the second light reflective surface, is reflected on the second light reflective surface to the light emitting surface, passes through the light emitting surface, and reaches the image forming unit.

8. The lens device as claimed in claim 1, wherein:

the light path turning module comprises the light incident surface, a first light reflective surface and a second light reflective surface;

the light emitted from the lens module enters the light path turning module through the light incident surface, is reflected on the first light reflective surface back to the light incident surface, is reflected on the light incident surface to the second light reflective surface, is reflected on the second light reflective surface to the light incident surface, and exits from the light incident surface.

9. The lens device as claimed in claim 1, wherein:

the light path turning module comprises the light incident surface, a first light reflective surface, a second light reflective surface, a third light reflective surface and the light emitting surface;

the light emitted from the lens module enters the light path turning module through the light incident surface, is reflected on the first light reflective surface back to the light incident surface, is reflected on the light incident surface to the second light reflective surface, is reflected on the second light reflective surface to the third light reflective surface, is reflected on the third light reflective surface to the light emitting surface, passes through the light emitting surface, and reaches the image forming unit.

10. The lens device as claimed in claim 1, wherein:

the light path turning module comprises the light incident surface, a first light reflective surface, a second light reflective surface and the light emitting surface;

the light emitted from the lens module enters the light path turning module through the light incident surface, is reflected on the first light reflective surface to the second light reflective surface, and is reflected on the second light reflective surface, passes through the light emitting surface, and reaches the image forming unit.

11. The lens device as claimed in claim 1, wherein the light path turning module comprises connecting surfaces, the connecting surfaces are configured to form a concave structure on the light path turning module, wherein the concave structure has sufficient depth for blocking peripheral light reflected by the light reflective surfaces which are disposed adjacent to each other, a light absorbing film is formed on the connecting surfaces.

12. The lens device as claimed in claim 1, wherein the light path turning module comprises the light incident surface and a light reflective surface, the lens module is disposed above the light incident surface, at a side of the light incident surface and aside from a center of the light incident surface.

13. The lens device as claimed in claim 1, wherein the light path turning module comprises at least two light path turning elements, and the light path turning elements have an air gap therebetween and/or a light blocking stop therebetween.

14. The lens device as claimed in claim 1, wherein the light path turning module comprises at least two light path turning elements, and the light path turning elements have an air gap therebetween and/or a light blocking stop therebetween.

15. The lens device as claimed in claim 12, wherein:

the lens module, the light path turning module and the image forming unit are arranged in order from an object side to an image side;

the light incident surface of the light path turning module is perpendicular to an optical axis of the lens module for changing a light path from the lens module to the image forming unit by plural reflections;

the lens module and the image forming unit are disposed at the same side of the light path turning module.

16. A lens device, comprising:

a lens module comprising one or plural lenses;

an image forming unit; and a light path turning module disposed between the lens module and the image forming unit and comprising a light incident surface being perpendicular to an optical axis of the lens module for changing a light path from the lens module to the image forming unit by plural reflections;

wherein light exiting from the lens module is reflected at least twice by the light path turning module;

the light path turning module comprises a first light reflective surface, a second light reflective surface and a third light reflective surface; the first light reflective surface meet the light incident surface; the second light reflective surface and the light incident surface lie on the same plane; the light coming from the lens module experiences three reflections in the light path turning module; the lens module is movable in a direction perpendicular to and/or parallel to the optical axis; or the third light reflective surface respectively intersects a plane on which the first light reflective surface lies and another plane on which the second light reflective surface lies; a light emitting surface of the light path turning module and the light incident surface lie on the same plane; a concave structure is formed between the first light reflective surface and the third light reflective surface; the image forming unit is moved perpendicular to the light emitting surface.

17. The lens device as claimed in claim 14, further comprising a focusing unit configured to change an optical path length between the lens module and the image forming unit, wherein the focusing unit is disposed between the light path turning module and the image forming unit and comprises a first focusing element and a second focusing element, the first focusing element and the second focusing element have a relative movement therebetween in same direction or in opposite directions.

18. The lens device as claimed in claim 17, wherein:

the first focusing element and the second focusing element are prisms and comprises inclined surfaces; the inclined surfaces of the first focusing element and the second focusing element are disposed corresponding to each other; the first focusing element and the second focusing element have the relative movement therebetween in the opposite directions; the opposite directions and the light emitting surface have an included angle greater than 0° and less than 90°, or the first focusing element and the second focusing element are moved in parallel to the light emitting surface; or the first focusing element and the second focusing element are lenses; the first focusing element and the second focusing element are moved perpendicular to the light emitting surface;

the first focusing element and the second focusing element have the relative movement therebetween in the same direction which is parallel to the optical axis.

19. The lens device as claimed in claim 16, wherein:

the third light reflective surface of the light path turning module respectively intersects a plane on which the first light reflective surface lies and another plane on which the light emitting surface lies, the third light reflective surface of the light path turning module is disposed in parallel to a plane on which the second light reflective surface lies;

the light path turning module comprises a first prism and a second prism, the light incident surface, the first light reflective surface and the second light reflective surface are disposed on the first prism, the third light reflective surface and the light emitting surface are disposed on the second prism, the first prism and the second prism have an air gap therebetween or are attached to each other;

the first prism is substantially in shape of an isosceles triangle, and the second prism is substantially in shape of a right trapezoidal or trapezoid with right angles; the image forming unit is disposed corresponding to the light emitting surface, is disposed diagonally above the second prism, and is inclined with respect to the optical axis of the lens module.

* * * * *